(12) United States Patent
Ise

(10) Patent No.: US 11,570,350 B2
(45) Date of Patent: Jan. 31, 2023

(54) DEVICE, CONTROL METHOD, AND STORAGE MEDIUM

(71) Applicant: CANON KABUSHIKI KAISHA, Tokyo (JP)

(72) Inventor: Yasuaki Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 17/184,869

(22) Filed: Feb. 25, 2021

(65) Prior Publication Data

US 2021/0274086 A1 Sep. 2, 2021

(30) Foreign Application Priority Data

Feb. 28, 2020 (JP) .............................. JP2020-033752

(51) Int. Cl.
*H04N 5/232* (2006.01)
*H04N 7/18* (2006.01)
(Continued)

(52) U.S. Cl.
CPC ........... *H04N 5/23206* (2013.01); *G06T 1/20* (2013.01); *G06T 1/60* (2013.01); *H04N 5/23229* (2013.01); *H04N 7/18* (2013.01)

(58) Field of Classification Search
CPC ........... H04N 5/23206; H04N 5/23229; H04N 5/23225; H04N 7/18; H04N 7/181; G06T 1/20; G06T 1/60
See application file for complete search history.

(56) References Cited

U.S. PATENT DOCUMENTS 9,728,077 B1 * 8/2017 Fu ........................ G08B 27/003
10,691,012 B2 6/2020 Ise
(Continued)

FOREIGN PATENT DOCUMENTS

CN 109993212 A 7/2019
EP 1860869 A1 11/2007
(Continued)

OTHER PUBLICATIONS

Partial European Search Report issued by the European Patent Office dated Jul. 23, 2021 in corresponding EP Patent Application No. 21159171.4.
(Continued)

*Primary Examiner* — Lin Ye
*Assistant Examiner* — John H Morehead, III
(74) *Attorney, Agent, or Firm* — Carter, DeLuca & Farrell LLP

(57) ABSTRACT

A device mounted in an apparatus including a mounting part capable of detaching/attaching is provided. The device is capable of executing at least one predetermined processing for image data and/or audio data obtained by an image capturing apparatus when the device is mounted in the image capturing apparatus including the mounting part. The device executes authentication based on identification information of the image capturing apparatus, if the authentication succeeds, controls the device such that processing selected by the image capturing apparatus from the at least one predetermined processing is executed for the image data and/or the audio data, and if the authentication fails, controls to disable a function of executing the selected processing in the device.

16 Claims, 16 Drawing Sheets

(51) Int. Cl.
*G06T 1/60* (2006.01)
*G06T 1/20* (2006.01)

(56) References Cited

U.S. PATENT DOCUMENTS

| | | | |
|---|---|---|---|
| 2004/0145660 A1* | 7/2004 | Kusaka | H04N 5/23206 |
| | | | 386/E5.072 |
| 2006/0001746 A1 | 1/2006 | Watanabe | |
| 2006/0114338 A1* | 6/2006 | Rothschild | G06F 16/58 |
| | | | 386/E5.072 |
| 2007/0055823 A1 | 3/2007 | Jo et al. | |
| 2007/0168652 A1 | 7/2007 | Mylly et al. | |
| 2011/0304706 A1 | 12/2011 | Border et al. | |
| 2013/0113944 A1 | 5/2013 | Fukushima | |
| 2014/0152777 A1 | 6/2014 | Galor et al. | |
| 2015/0015734 A1 | 1/2015 | Matsuo | |
| 2015/0242149 A1 | 8/2015 | Kim et al. | |
| 2015/0248368 A1 | 9/2015 | Otsuka | |
| 2015/0379725 A1 | 12/2015 | Kuwahara et al. | |
| 2016/0198093 A1 | 7/2016 | Ito et al. | |
| 2017/0206424 A1 | 7/2017 | Uchida et al. | |
| 2020/0045243 A1 | 2/2020 | Aramaki et al. | |
| 2020/0234412 A1 | 7/2020 | Ise | |
| 2020/0389579 A1 | 12/2020 | Ise | |
| 2021/0092322 A1 | 3/2021 | Aramaki | |
| 2021/0136249 A1 | 5/2021 | Aramaki et al. | |
| 2021/0274079 A1 | 9/2021 | Ise | |
| 2021/0274095 A1 | 9/2021 | Aramaki | |
| 2021/0306591 A1* | 9/2021 | Maeda | H04N 5/907 |

FOREIGN PATENT DOCUMENTS

| | | |
|---|---|---|
| JP | 2001147254 A | 5/2001 |
| JP | 2005-345802 A | 12/2005 |
| JP | 2011168099 A | 9/2011 |
| JP | 2018-157601 A | 10/2018 |
| WO | 0127763 A1 | 4/2001 |
| WO | 2016/031720 A1 | 3/2016 |
| WO | 2017104218 A1 | 6/2017 |

OTHER PUBLICATIONS

Redmon, J. et al., "YOLO9000: Better Faster Stronger" Computer Vision and Pattern Recognition (CVPR), arXiv: 1612.08242v1 (Dec. 2016) pp. 1-9.

Extended European Search Report issued by the European Patent Office dated Dec. 16, 2021 in corresponding EP Patent Application No. 21159171.4.

Partial European Search Report issued by the European Patent Office dated Jul. 19, 2021 in corresponding EP Patent Application No. 21159170 6.

Extended European Search Report issued by the European Patent Office dated Jan. 3, 2022 in corresponding EP Patent Application No. 21159170.6.

Non-Final Office Action issued by the U.S. Patent and Trademark Office dated Aug. 4, 2022 in corresponding U.S. Appl. No. 17/184,925.

* cited by examiner

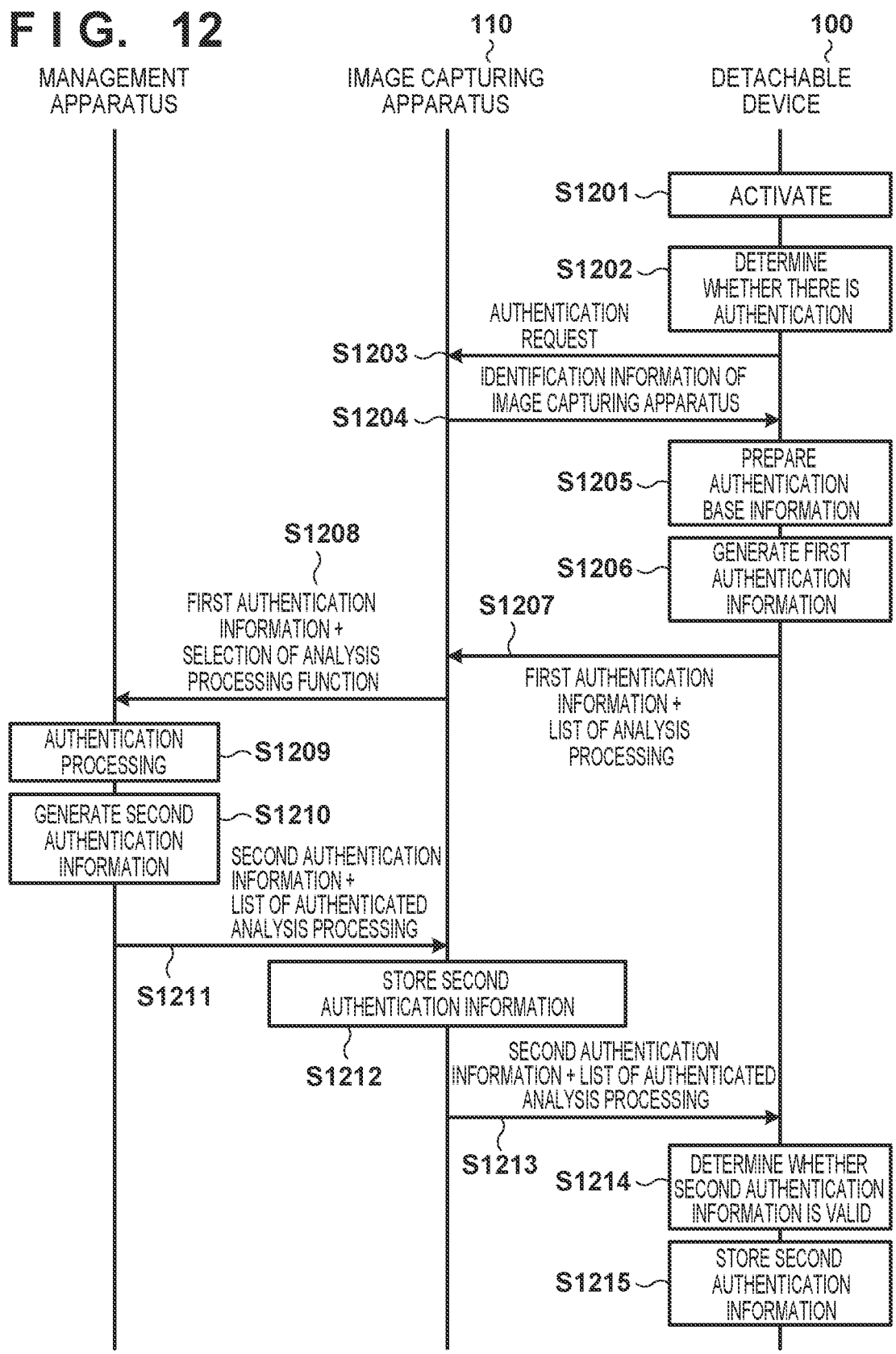

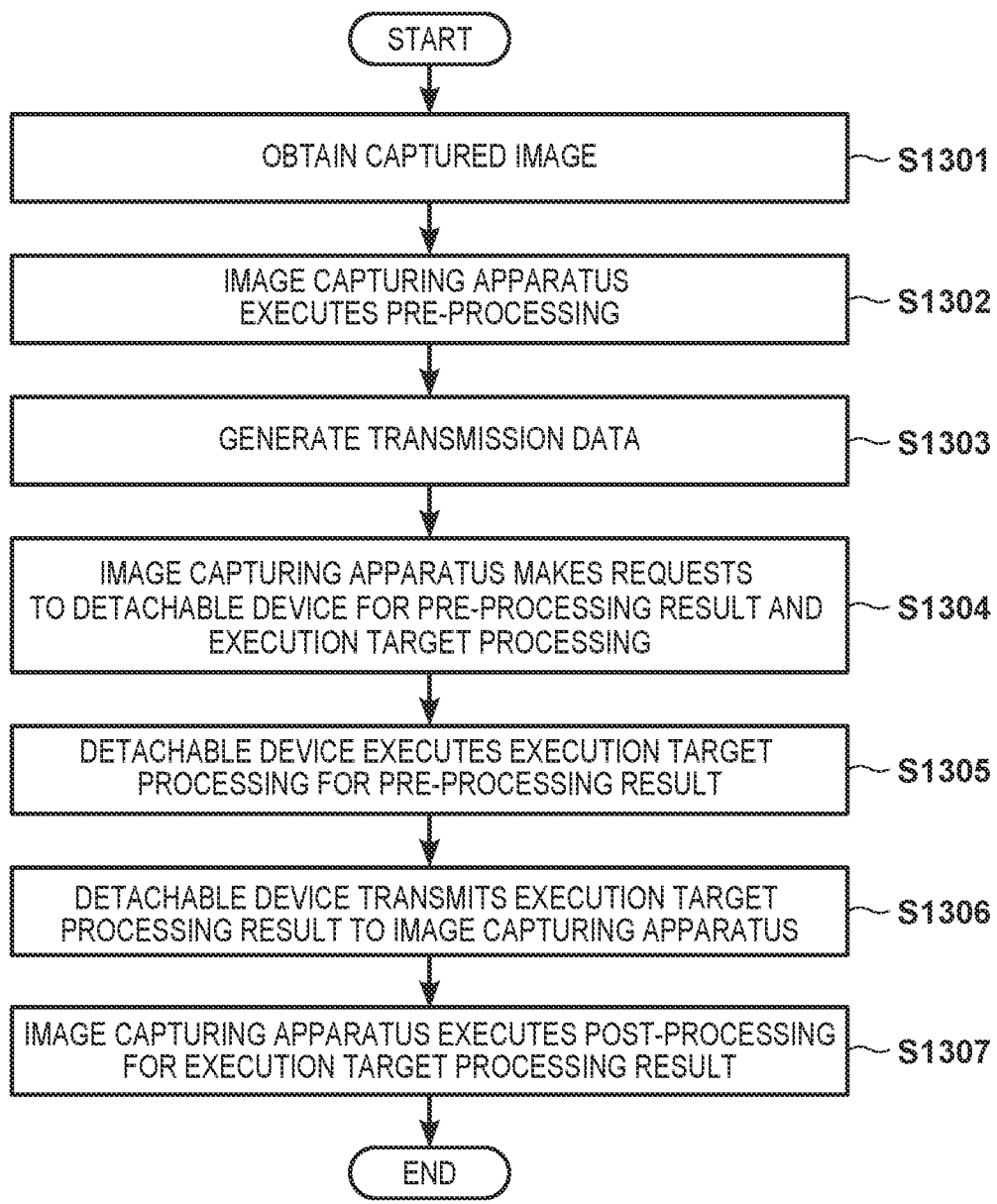

FIG. 17A

| ADDRESS | DATA |
|---|---|
| AD0 | AUTHENTICATION INFORMATION |
| AD1 | ANALYSIS PROCESSING LIST |
| AD2 | CIRCUIT INFORMATION 1 |
| AD3 | CIRCUIT INFORMATION 2 |
| AD4 | CIRCUIT INFORMATION 3 |
| AD5 | CIRCUIT INFORMATION 4 |
| AD6 | SET VALUE 1 |
| AD7 | SET VALUE 2 |
| AD8 | SET VALUE 3 |
| AD9 | SET VALUE 4 |

FIG. 17B

| | | | AUTHENTICATED ANALYSIS PROCESSING FUNCTION | |
|---|---|---|---|---|
| NUMBER | TYPE | ADDRESS | APPARATUS A | APPARATUS B |
| 0001 | C1F0 | AD2 | 0 | 1 |
| 0002 | C3F2 | AD3 | 1 | 0 |
| 0003 | C*** | AD4 | 0 | 0 |
| 0004 | C*** | AD5 | 1 | 0 |
| 0005 | P*** | AD6 | 0 | 1 |
| 0006 | P*** | AD7 | 1 | 1 |
| 0007 | P*** | AD8 | 1 | 1 |
| 0008 | P*** | AD9 | 0 | 0 |

DEVICE, CONTROL METHOD, AND STORAGE MEDIUM

BACKGROUND OF THE INVENTION

Field of the Invention

The present invention relates to a technique for improving usability in a system in which a detachable device capable of executing a predetermined function is used.

Description of the Related Art

The present invention relates to a technique for improving usability in a detachable device capable of executing a predetermined function.

In recent years, image processing such as image analysis of performing object detection and tracking or performing attribute estimation, and estimation of the number of objects based on the result of such image analysis is performed in various scenes using images captured by a monitoring camera Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by an arithmetic apparatus arranged in a camera main body. When the arithmetic apparatus is arranged in a detachable device such as a USB, it is possible to extend functions executable on the camera side and share processing with the camera.

Japanese Patent Laid-Open No. 2005-345802 describes, to appropriately use a detachable device, discriminating what kind of detachable device is mounted from a camera main body and performing control according to the type of the detachable device mounted in the camera. In the technique described in Japanese Patent Laid-Open No. 2005-345802, however, since control is performed based on only the type of the detachable device, it may be impossible to perform appropriate control in a situation in which a function is changed in a device of the same type.

The present invention provides a technique for appropriately controlling a detachable device that can be configured to be able to execute various kinds of functions.

SUMMARY OF THE INVENTION

According to one aspect of the present invention, there is provided a device mounted in an apparatus including a mounting part capable of detaching/attaching the device, comprising: a processing unit capable of executing at least one predetermined processing for at least one of image data captured by an image capturing apparatus and audio data recorded by the image capturing apparatus when the device is mounted in the image capturing apparatus including the mounting part, an authentication unit configured to execute authentication based on identification information of the image capturing apparatus; and a control unit configured to, if the authentication succeeds, control the processing unit such that processing selected by the image capturing apparatus from the at least one predetermined processing is executed for at least one of the image data and the audio data, and if the authentication fails, perform control to disable a function of executing the selected processing in the processing unit of the device.

Further features of the present invention will become apparent from the following description of exemplary embodiments (with reference to the attached drawings).

BRIEF DESCRIPTION OF THE DRAWINGS

FIG. 12 is a sequence chart showing an example of the procedure of authentication processing;

FIG. 13 is a flowchart showing an example of the procedure of control when executing image analysis processing:

FIGS. 17A to 17C are schematic views showing an example of information stored in the detachable device:

DESCRIPTION OF THE EMBODIMENTS

Figure 1:
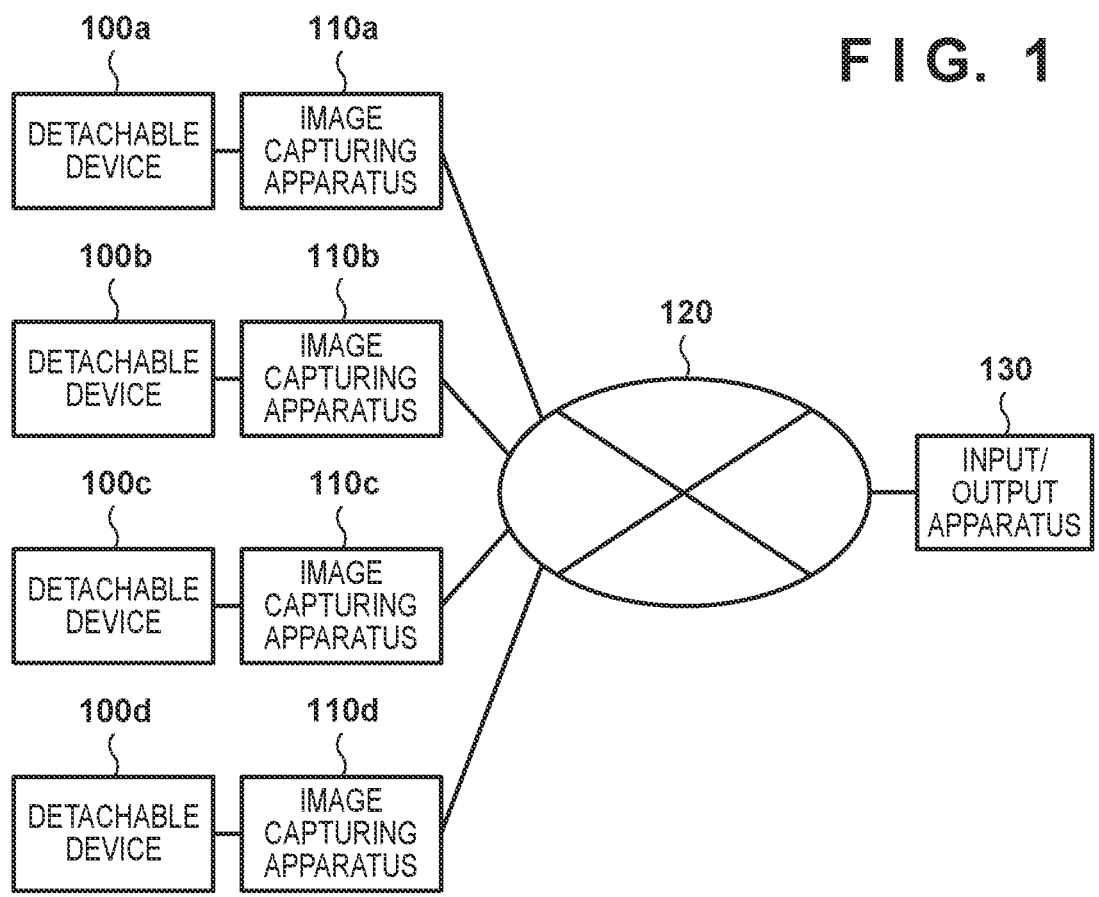
FIG. 1 is a block diagram showing an example of a system arrangement.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include image capturing apparatuses 110a to 110d, a network 120, and an input/output apparatus 130. Note that the image capturing apparatuses 110a to 110d each include a slot to/from which a device capable of recording, for example, a captured image can be attached/detached, and when the detachable devices 100a to 100d are inserted into the slots, the image capturing apparatuses 110a to 110d are connected to the detachable devices 100a to 100d. Note that the detachable devices 100a to 100d will be referred to as "detachable devices 100", and the image capturing apparatuses 110a to 110d will be referred to as "image capturing apparatuses 110" hereinafter.

The detachable device 100 is an arithmetic device attachable/detachable to/from the image capturing apparatus 110. As an example, the detachable device 100 is a device with a predetermined processing circuit mounted in an SD card. The detachable device 100 is configured to be inserted as a whole into the image capturing apparatus 110 in a form of, for example, an SD card, and can therefore be configured to be connectable to the image capturing apparatus 110 without making any portion project from the image capturing apparatus 110. This can prevent the detachable device 100 from interfering with an obstacle such as a wiring and raise the convenience when using the device. In addition, since an SD card slot is prepared in a lot of existing image capturing apparatuses 110 such as a network camera, the detachable device 100 can provide an extension function to the existing image capturing apparatus 110. Note that other than the form of an SD card, the detachable device 100 may be configured to be mounted in the image capturing apparatus 110 via an arbitrary interface used when mounting a storage device capable of storing an image captured by at least the image capturing apparatus 110. For example, the detachable device 100 may include a USB (Universal Serial Bus) interface, and may be configured to be mounted in a USB socket of the image capturing apparatus 110. The predetermined processing circuit is implemented by, for example, an FPGA (Field Programmable Gate Array) programmed to execute predetermined processing but may be implemented in another form.

The image capturing apparatus 110 is an image capturing apparatus such as a network camera. In this embodiment, the image capturing apparatus 110 incorporates an arithmetic apparatus capable of processing a video but is not limited to this. For example, an external computer such as a PC (Personal Computer) connected to the image capturing apparatus 110 may exist, and the combination may be handled as the image capturing apparatus 110. Additionally, in this embodiment, the detachable devices 100 are mounted in all the image capturing apparatuses 110. Note that FIG. 1 shows four image capturing apparatuses 110, and the detachable devices mounted in these. The number of combinations of devices may be three or less, or five or more. When the detachable device 100 having an image analysis processing function is mounted in the image capturing apparatus 110, video processing can be executed on the side of the image capturing apparatus 110 even if the image capturing apparatus 110 does not have the image analysis processing function. Also, in a form in which an arithmetic apparatus for video processing is arranged in the image capturing apparatus 110, as in this embodiment, image processing executable on the side of the image capturing apparatus 110 can be diversified/sophisticated by mounting the detachable device 100 including an arithmetic apparatus in the image capturing apparatus 110.

The input/output apparatus 130 is an apparatus that performs acceptance of input from a user and output of information (for example, display of information) to the user. In this embodiment, for example, the input/output apparatus 130 is a computer such as a PC, and information is input/output by a browser or a native application installed in the computer.

The image capturing apparatuses 110 and the input/output apparatus 130 are communicably connected via the network 120. The network 120 is configured to include a plurality of routers, switches, cables, and the like, which satisfy the communication standard of, for example, Ethernet®. In this embodiment, the network 120 can be an arbitrary network that enables communication between the image capturing apparatus 110 and the input/output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>

(Arrangement of Image Capturing Apparatus)

Figure 2:
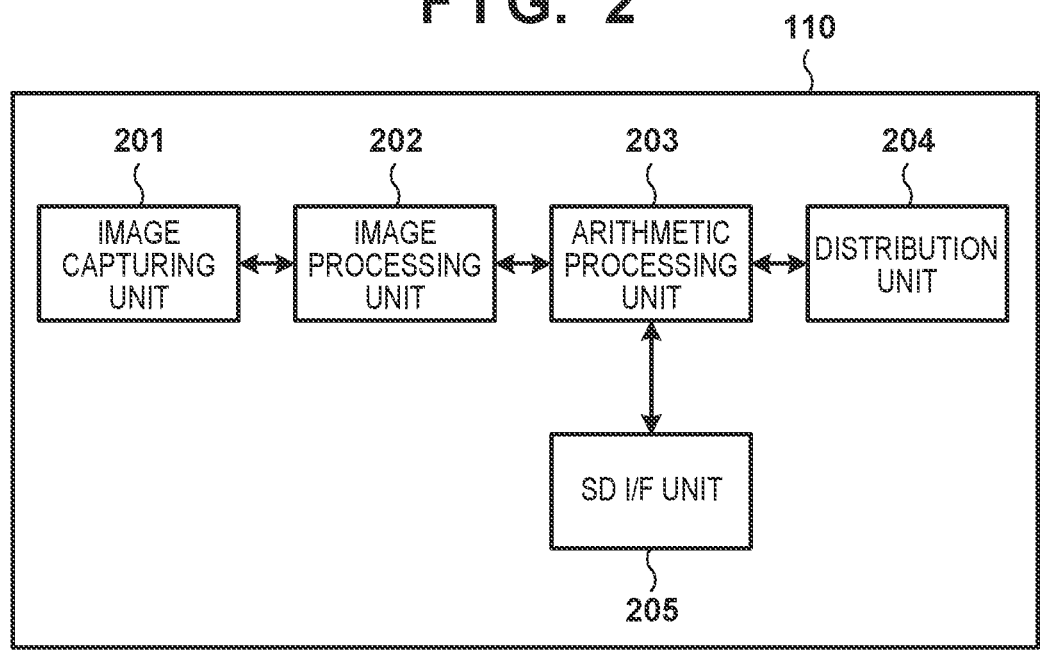
FIG. 2 is a block diagram showing an example of the hardware arrangement of an image capturing apparatus.

The arrangement of the image capturing apparatus 110 will be described next. FIG. 2 is a block diagram showing an example of the hardware arrangement of the image capturing apparatus 110. As the hardware arrangement, the image capturing apparatus 110 includes, for example, an image capturing unit 201, an image processing unit 202, an arithmetic processing unit 203, a distribution unit 204, and an SD I/F unit 205. Note that I/F is an abbreviation of interface.

The image capturing unit 201 is configured to include a lens portion configured to form an image of light, and an image capturing element that performs analog signal conversion according to the formed image of light. The lens portion has a zoom function of adjusting an angle of view, a stop function of adjusting a light amount, and the like. The image capturing element has again function of adjusting sensitivity when converting light into an analog signal. These functions are adjusted based on set values notified from the image processing unit 202. The analog signal obtained by the image capturing unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capturing unit 201, thereby generating image data. The image processing unit 202 can also transmit set values to the lens portion and the image capturing element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capturing apparatus 110 and the detachable device 100 should execute each portion of processing to be executed in the above-described system, and execute processing corresponding to the allocation. Details of processing contents and processing allocation will be described later. The image received from the image processing unit 202 is transferred to the distribution unit 204 or the SD I/F unit 205. The data of the processing result is also transferred to the distribution unit 204.

The distribution unit 204 is configured to include a network distribution engine and, for example, peripheral devices such as a RAM and an ETH PHY module. The ETH PHY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and a mounting part such as an attaching/detaching socket used to attach/detach the detachable device 100. Here, the SD I/F unit 205 is configured in accordance with the SD standard formulated by the SD Association. Communication between the detachable device 100 and the image capturing apparatus 110, such as transfer of an image obtained from the arithmetic processing unit 203 to the detachable device 100 or data obtaining from the detachable device 100, is performed via the SD I/F unit 205.

Figure 3:
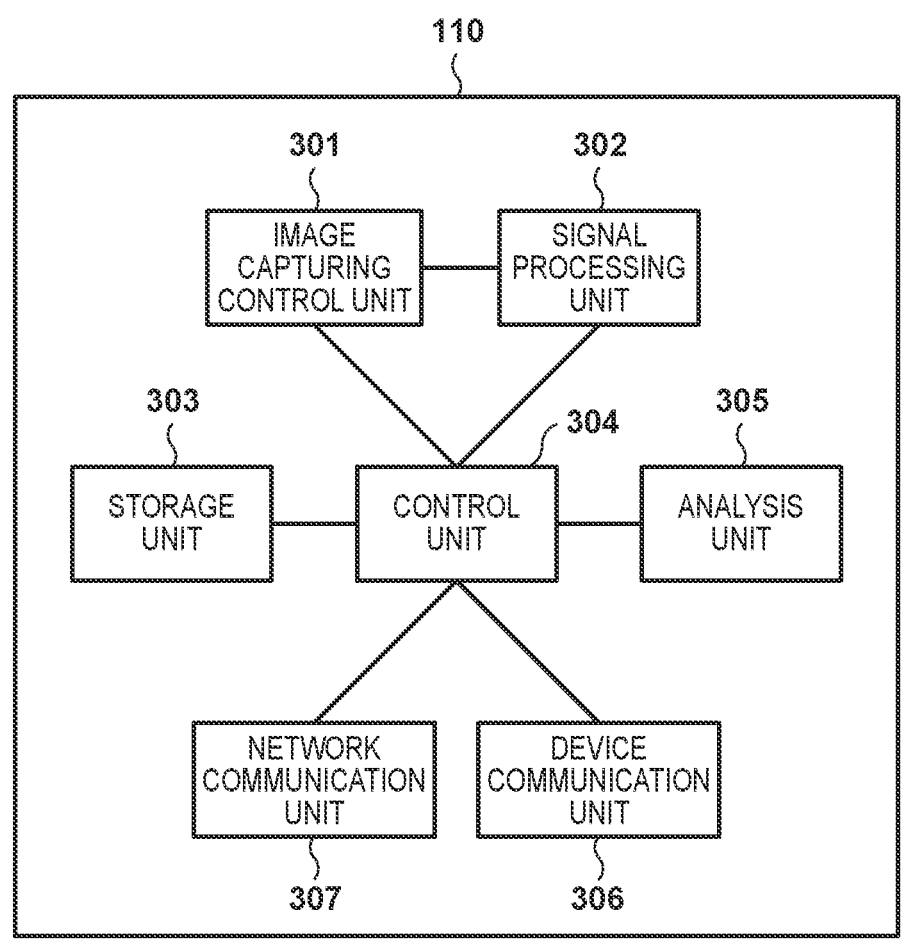
FIG. 3 is a block diagram showing an example of the functional arrangement of the image capturing apparatus.

FIG. 3 shows an example of the functional arrangement of the image capturing apparatus 110. The image capturing apparatus 110 includes, as its functions, for example, an image capturing control unit 301, a signal processing unit 302, a storage unit 303, a control unit 304, an analysis unit 305, a device communication unit 306, and a network communication unit 307.

The image capturing control unit 301 executes control of capturing the peripheral environment via the image capturing unit 201. The signal processing unit 302 performs predetermined processing for the image captured by the image capturing control unit 301, thereby generating data of the captured image. The data of the captured image will simply be referred to as the "captured image" hereinafter. The signal processing unit 302, for example, encodes the image captured by the image capturing control unit 301. The signal processing unit 302 performs encoding for a still image using, for example, an encoding method such as JPEG (Joint Photographic Experts Group). The signal processing unit 302 performs encoding for a video using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capturing apparatus 110.

The storage unit 303 stores a list (to be referred to as a "first processing list" hereinafter) of analysis processing executable by the analysis unit 305 and a list of post-processes for a result of analysis processing. The storage unit 303 also stores a result of analysis processing to be described later. Note that in this embodiment, processing to be executed is analysis processing. However, arbitrary processing may be executed, and concerning processing associated with the processing to be executed, the storage unit 303 may store the first processing list and the list of post-processes. The control unit 304 controls the signal processing unit 302, the storage unit 303, the analysis unit 305, the device communication unit 306, and the network communication unit 307 to execute predetermined processing.

The analysis unit 305 selectively executes at least one of pre-analysis processing, analysis processing, and post-analysis processing to be described later for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique in J. Redmon and A. Faiadi "YOLO9000: Better Faster Stronger" Computer Vision and Pattern Recognition (CVPR) 2016. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the image capturing apparatus 110. In this embodiment, as the conversion processing, the device communication unit 306 executes processing of converting a decimal between a floating point format and a fixed point format. However, the present invention is not limited to this, and another process may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input/output apparatus 130 via the network 120.

(Arrangement of Detachable Device)

Figure 4:
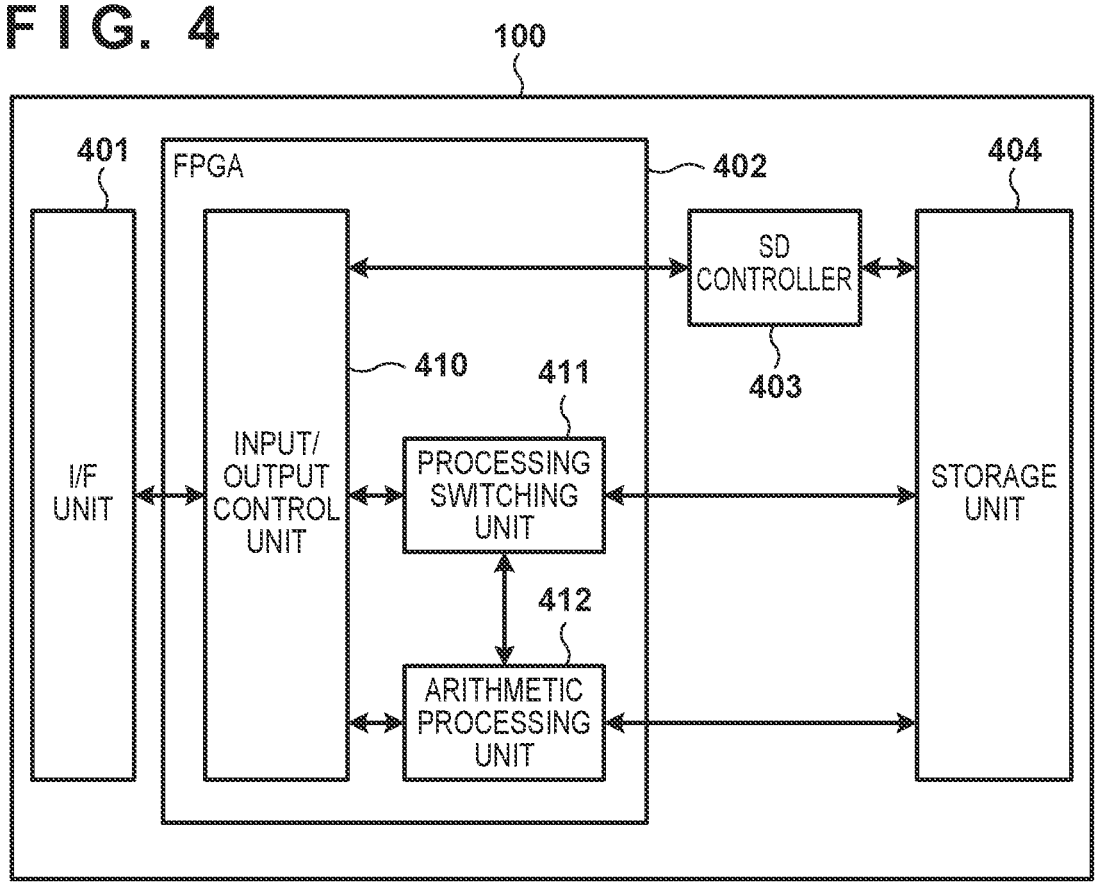
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the image capturing apparatus 110, that is, a shape complying with the SD standard.

The I/F unit 401 is an interface portion used to connect an apparatus such as the image capturing apparatus 110 and the detachable device 100. The I/F unit 401 is configured to include, for example, an electrical contact terminal that receives supply of power from the image capturing apparatus 110 and generates and distributes a power supply to be used in the detachable device 100, and the like. Concerning items defined in (complying with) the SD standard, the I/F unit 401 complies with that, like the SD I/F unit 205 of the image capturing apparatus 110. Reception of images and setting data from the image capturing apparatus 110 and transmission of data from the FPGA 402 to the image capturing apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconfiguring an internal logic circuit structure. By processing implemented by the FPGA 402, a processing function can be added (provided) to the apparatus in which the detachable device 100 is mounted. Additionally, since the logic circuit structure can be changed later by the reconfiguration function of the FPGA 402, when the detachable device 100 is mounted in, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be implemented. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, the image capturing apparatus 110 may write the setting data in the FPGA 402 via the I/F unit 401 by implementing a dedicated circuit in the detachable device.

The input/output control unit 410 is configured to include a circuit used to transmit/receive an image to/from the image capturing apparatus 110, a circuit that analyzes a command received from the image capturing apparatus 110, a circuit that controls based on a result of analysis, and the like. Commands here are defined by the SD standard, and the input/output control unit 410 can detect some of them. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the image capturing apparatus 110 and write the information in the arithmetic processing unit 412. The information of the image analysis processing function includes setting parameters representing, for example, the order and types of operations processed in the arithmetic processing unit 412, the coefficients of operations, and the like. The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the image capturing apparatus 110, and/or records the processing result in the storage unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capturing apparatus 110. Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the image capturing apparatus 110, the information of the image analysis processing function written in the arithmetic processing unit 412, and setting data of the FPGA 402.

Figure 5:
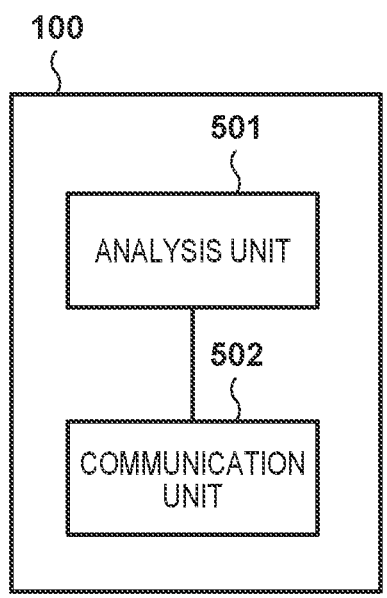
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501 and a communication unit 502. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing to be described later) of determining whether a person stored in advance is included in an image. For example, if the degree of matching between the image feature of a person stored in advance and the image feature of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capturing apparatus 110. Also, in this embodiment, analysis processing for a captured image will be described. It can also be applied to audio data recorded by performing video capturing. The communication unit 502 performs communication with the image capturing apparatus 110 via the I/F unit 401.

(Arrangement of Input/Output Apparatus)

Figure 6:
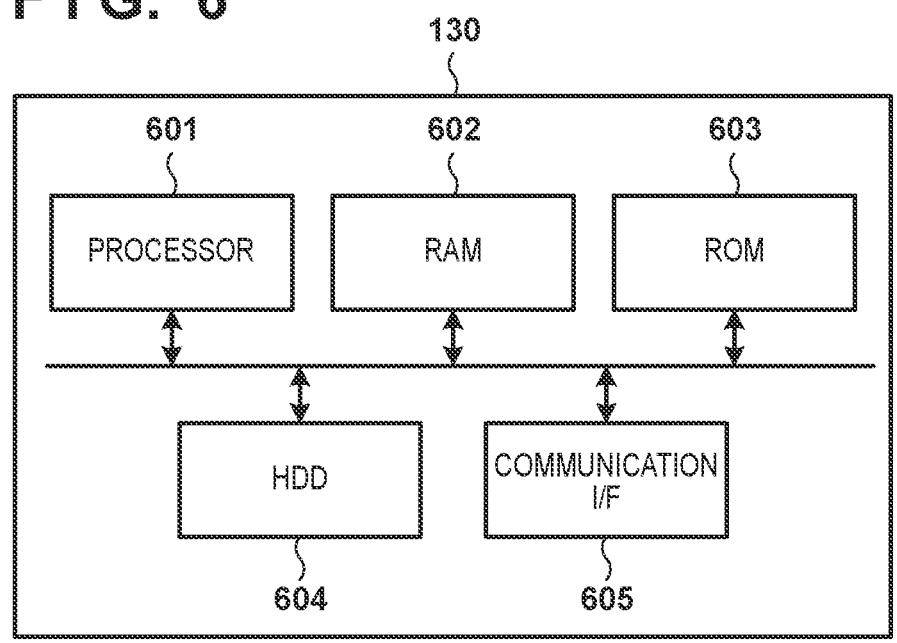
FIG. 6 is a block diagram showing an example of the hardware arrangement of an input/output apparatus.

FIG. 6 shows an example of the hardware arrangement of the input/output apparatus 130. The input/output apparatus 130 is formed as a computer such as a general PC, and is configured to include, for example, a processor 601 such as a CPU, memories such as a RAM 602 and a ROM 603, a storage device such as an HDD 604, and a communication I/F 605, as shown in FIG. 6. The input/output apparatus 130 can execute various kinds of functions by executing, by the processor 601, programs stored in the memories and the storage device.

Figure 7:
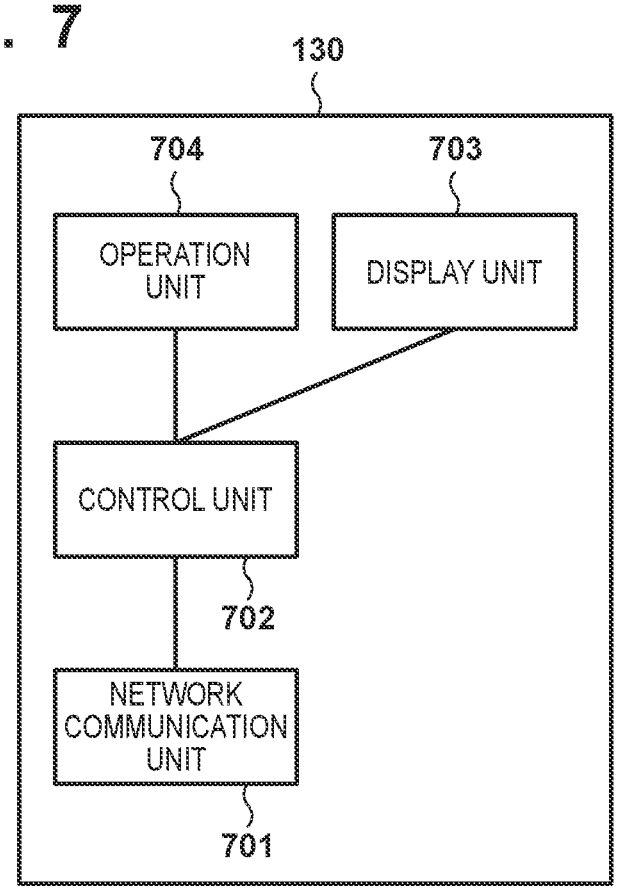
FIG. 7 is a block diagram showing an example of the functional arrangement of the input/output apparatus.

FIG. 7 shows an example of the functional arrangement of the input/output apparatus 130 according to this embodiment. The input/output apparatus 130 includes, as its functional arrangement, for example, a network communication unit 701, a control unit 702, a display unit 703, and an operation unit 704. The network communication unit 701 is connected to, for example, the network 120 and executes communication with an external apparatus such as the image capturing apparatus 110 via the network 120. Note that this is merely an example and, for example, the network communication unit 701 may be configured to establish direct communication with the image capturing apparatus 110 and communicate with the image capturing apparatus 110 without intervention of the network 120 or other apparatus. The control unit 702 controls such that the network communication unit 701, the display unit 703, and the operation unit 704 execute processing of their own. The display unit 703 presents information to the user via, for example, a display. In this embodiment, a result of rendering by a browser is displayed on a display, thereby presenting information to the user. Note that information may be presented by a method such as an audio or a vibration other than screen display. The operation unit 704 accepts an operation from the user. In this embodiment, the operation unit 704 is a mouse or a keyboard, and the user operates these to input a user operation to the browser. However, the operation unit 704 is not limited to this and may be, for example, another arbitrary device capable of detecting a user's intention, such as a touch panel or a microphone.

<Procedure of Processing>

An example of the procedure of processing executed in the system will be described next. Note that processing executed by the image capturing apparatus 110 in the following processes is implemented by, for example, a processor in the arithmetic processing unit 203, executing a program stored in a memory or the like. However, this is merely an example, and processing to be described later may partially or wholly be implemented by dedicated hardware. In addition, processing executed by the detachable device 100 or the input/output apparatus 130 may also be implemented by, by a processor in each apparatus, executing a program stored in a memory or the like, and processing may partially or wholly be implemented by dedicated hardware.

Figure 8:
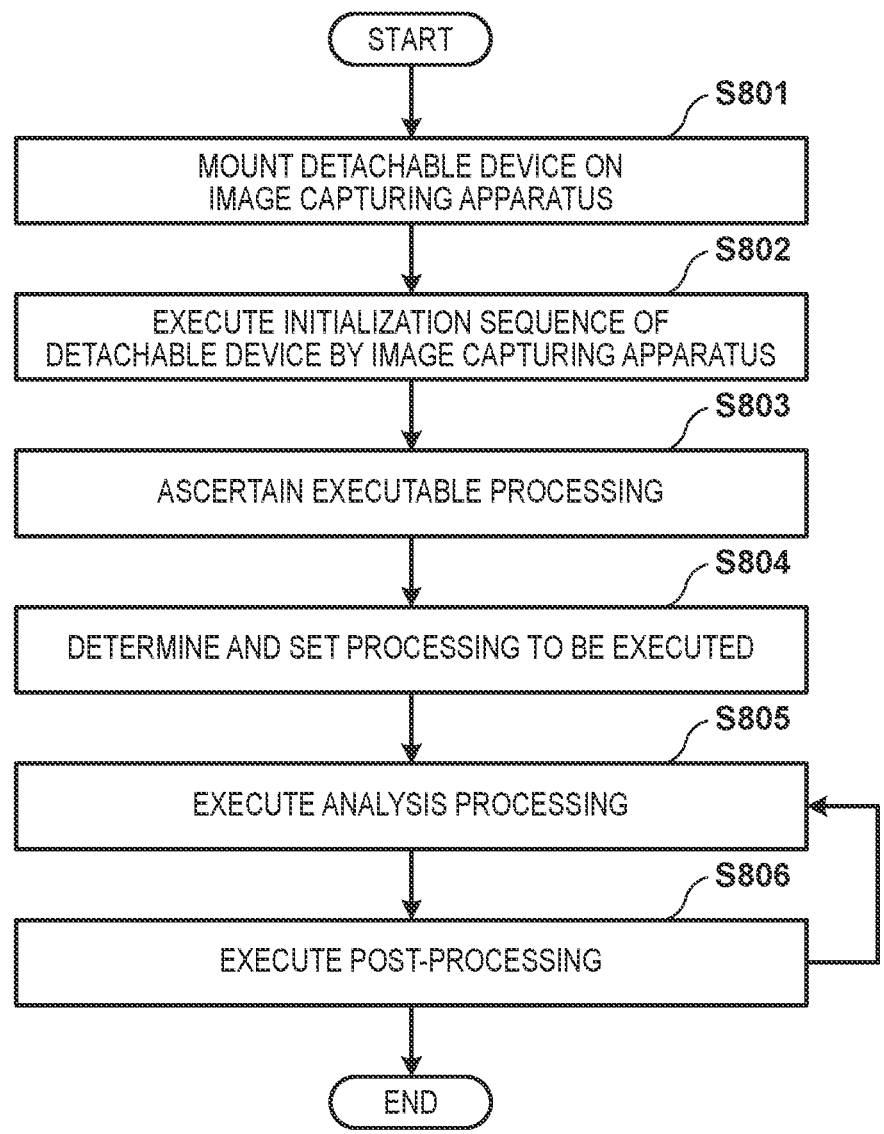
FIG. 8 is a flowchart showing an example of the procedure of processing executed by the system.

FIG. 8 schematically shows a series of procedures of image analysis processing executed by the system. In this processing, first, the user mounts the detachable device 100 in the image capturing apparatus 110 (step S801). The image capturing apparatus 110 executes an initialization sequence of the detachable device 100 (step S802). In this initialization sequence, predetermined commands are transmitted/received between the image capturing apparatus 110 and the detachable device 100, and the image capturing apparatus 110 thus makes detachable device 100 usable. After that, the image capturing apparatus 110 ascertains processing executable by the detachable device 100, and ascertains processing that can be executed locally (that can be executed only by the image capturing apparatus 110 or by the combination of the image capturing apparatus 110 and the detachable device 100) (step S803). Note that although the detachable device 100 can be configured to execute arbitrary processing, processing irrelevant to processing that should be executed on the side of the image capturing apparatus 110 need not be taken into consideration. In an example, the image capturing apparatus 110 may hold a list of executable processes, which is obtained in advance from, for example, the input/output apparatus 130. In this case, when obtaining, from the detachable device 100, information representing processing executable by the detachable device 100, the image capturing apparatus 110 can ascertain only the executable processing depending on whether the processing is included in the list. Next, the image capturing apparatus 110 determines processing to be executed, and executes setting of the detachable device 100 as needed (step S804). That is, if at least part of processing determined as an execution target is to be executed by the detachable device 100, setting of the detachable device 100 for the processing is executed. In this setting, for example, reconfiguration of the FPGA 402 using setting data corresponding to the processing of the execution target can be performed. Then, the image capturing apparatus 110 or the detachable device 100 executes analysis processing (step S805). After that, the image capturing apparatus 110 executes post-processing (step S806). Note that the processes of steps S805 and S806 are repetitively executed. The processing shown in FIG. 8 is executed when, for example, the detachable device 100 is mounted. However, at least part of the processing shown in FIG. 8 may repetitively be executed such that, for example, the process of step S803 is executed again when the detachable device 100 is detached.

Figure 9:
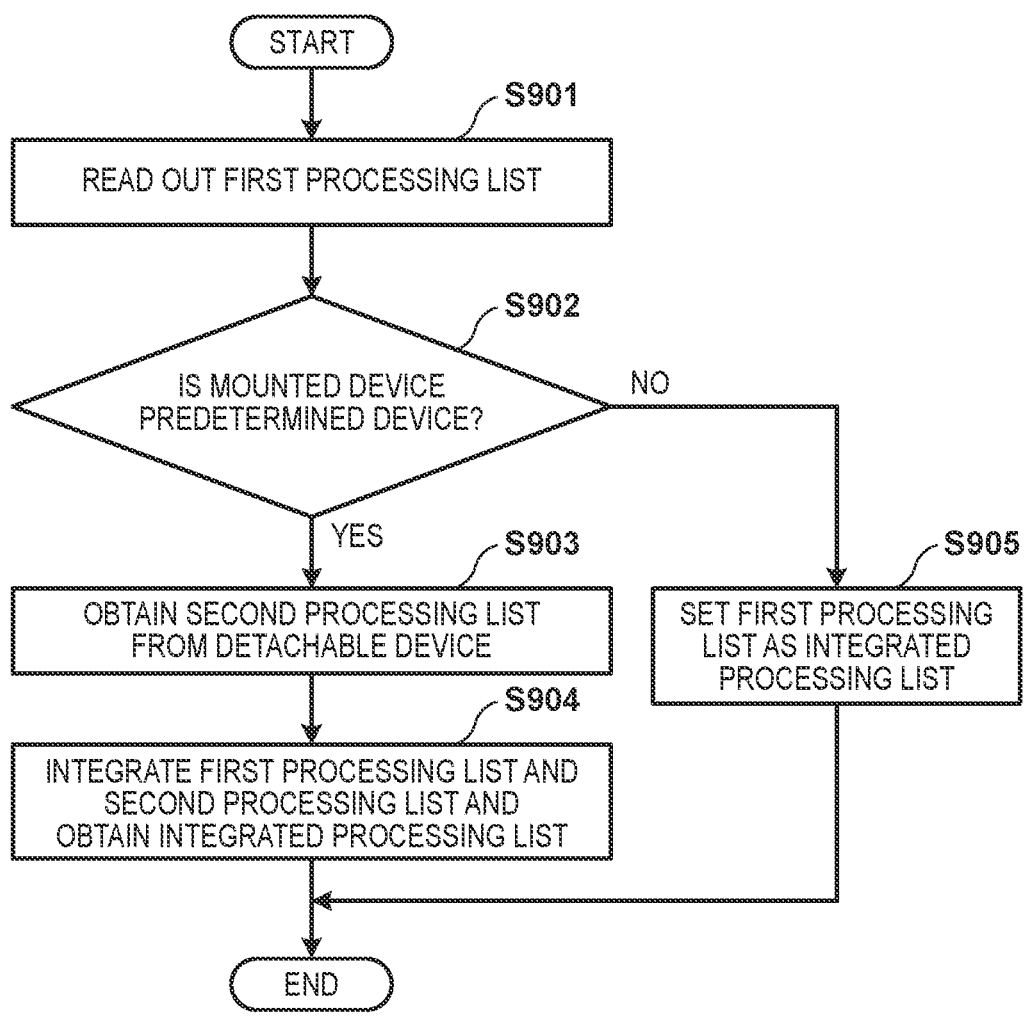
FIG. 9 is a flowchart showing an example of the procedure of processing of ascertaining analysis processing.

FIG. 9 shows an example of the procedure of processing of ascertaining processing executable by the image capturing apparatus 110. This processing corresponds to the process of step S803 in FIG. 8, and can be executed if a device such as the detachable device 100 is mounted on the image capturing apparatus 110 or removed, or if the image capturing apparatus 110 is powered on. In this processing, the image capturing apparatus 110 reads out processing executable by the detachable device 100, and ascertains analysis processing executable on the side of the image capturing apparatus 110.

First, the control unit 304 of the image capturing apparatus 110 reads out a list (first processing list) of analysis processes executable by the analysis unit 305, which is stored in the storage unit 303 (step S901). Additionally, the control unit 304 of the image capturing apparatus 110 determines whether the mounted device is, for example, a conventional device having only a storage function of a predetermined device such as the detachable device 100 having a specific processing function (step S902). For example, the control unit 304 controls the device communication unit 306 to issue a read request (read command) for a specific address to the mounted device and read out flag data stored at the specific address. The specific address will sometimes be referred to as an "address A" hereinafter. The control unit 304 can determine, based on the read flag data, whether the detachable device 100 is a predetermined device having a specific processing function. However, this is merely an example, and it may be determined by another method whether the mounted device is a predetermined device. Upon determining that the mounted device is a predetermined device (YES in step S902), the control unit 304 executes processing of ascertaining processing executable in the device (detachable device 100). The control unit 304 controls the device communication unit 306 to communicate with detachable device 100 and obtain a list (this list will be referred to as a "second processing list" hereinafter) of processes executable in the detachable device 100 (step S903). The control unit 304 reads out the data stored at the address A as in a case in which, for example, it is determined whether the detachable device 100 is a predetermined device, thereby obtaining an executable processing list. Note that, for example, the second processing list can be stored at the same address (address A) as the flag data used to determine whether the detachable device is a predetermined device. In this case, the image capturing apparatus 110 can simultaneously execute the process of step S902 and the process of step S903 by accessing the address A and simultaneously obtaining the flag data and the second processing list. However, the present invention is not limited to this, and these data may be stored at different addresses. After that, the control unit 304 creates an integrated processing list in which the first processing list of processes executable by the image capturing apparatus 110 itself, which is read out from the storage unit 303, and the second processing list obtained from the detachable device 100 are integrated (step S904), and ends the processing. On the other hand, upon determining that the mounted device is not a predetermined device (NO in step S902), the control unit 304 sets the first processing list read out in step S901 as the integrated processing list (step S905), and ends the processing.

In this embodiment, processing executable on the side of the image capturing apparatus 110 can be extended by mounting the detachable device 100 in the image capturing apparatus 110 in the above-described way. On the other hand, depending on the apparatus in which the detachable device 100 is mounted, it may be impossible to cause the detachable device 100 to appropriately execute processing, and in some cases, an erroneous processing result may be output because of malfunction. Hence, in this embodiment, control is performed such that, for example, only an apparatus whose operation for predetermined processing is confirmed in advance is allowed to perform the predetermined processing. In this embodiment, for this control, the detachable device 100 executes authentication processing based on information obtained from the apparatus in which the self-device is mounted, provides an analysis processing function to an apparatus that has succeeded authentication, and does not provide the analysis processing function to an apparatus that has failed authentication. An example of the arrangement of the detachable device 100 that executes such processing and an example of the procedure of processing will be described below.

Figure 10:
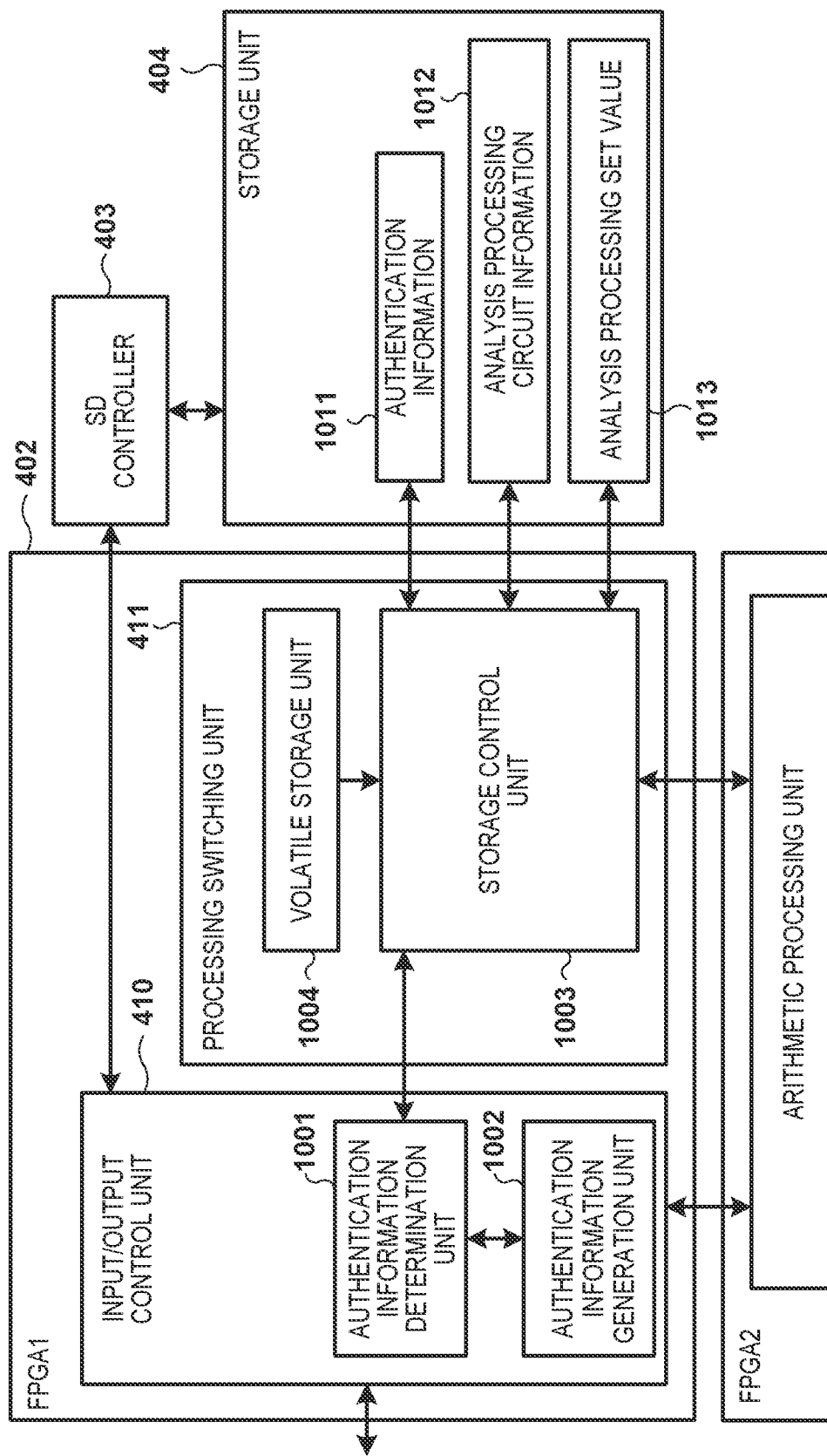
FIG. 10 is a view showing an example of the arrangement of the detachable device in a case in which authentication processing is performed.

FIG. 10 shows an example of the arrangement of the detachable device 100 configured to perform authentication processing. FIG. 10 shows details of the arrangements of the FPGA 402 and the storage unit 404 of the detachable device 100 shown in FIG. 4. Note that FIG. 10 shows an example in a case in which the arithmetic processing unit 412 and the processing switching unit 411 are formed by different FPGAs. Each functional unit shown in FIG. 10 may be implemented by, for example, executing a predetermined program by one or more processors in the detachable device 100 or may be implemented as a hardware circuit that implements each operation to be described later. The input/output control unit 410 can include, as its functions, an authentication information determination unit 1001 and an authentication information generation unit 1002. The processing switching unit 411 can include, as its functions, a storage control unit 1003 and a volatile storage unit 1004. The storage unit 404 can be configured to hold authentication information 1011, analysis processing circuit information 1012, and an analysis processing set value 1013.

The authentication information determination unit 1001 detects whether authentication information is included in data transmitted from the image capturing apparatus 110, and determines whether the authentication information matches authentication information held in the storage unit 404. Based on the authentication information and the identification information of the detachable device 100, which are held in the storage unit, the authentication information generation unit 1002 executes an operation for generating authentication information used to perform authentication with the image capturing apparatus 110 in which the detachable device 100 is mounted. In addition, the authentication information generation unit 1002 newly calculates authentication information based on the determination result of the authentication information determination unit 1001. Details of authentication information generation will be described later.

The storage control unit 1003 controls a read of data stored in the storage unit 404 and a write of data in the storage unit 404. In response to a request from the authentication information determination unit 1001, the storage control unit 1003 reads out the authentication information 1011 from the storage unit 404 and outputs it to the authentication information determination unit 1001. Also, based on setting information received from the image capturing apparatus 110 and used to execute analysis processing, the storage control unit 1003 reads out the information of an image analysis processing function from the storage unit 404 and writes it in the arithmetic processing unit 412. When the storage control unit 1003 selects the analysis processing circuit information 1012 in accordance with the setting information from the image capturing apparatus 110 and sends the information to the arithmetic processing unit 412, a logic circuit that performs analysis processing is configured in the arithmetic processing unit 412. In a state in which the logic circuit is configured in the arithmetic processing unit 412, the storage control unit 1003 sets, in the arithmetic processing unit 412, the analysis processing set value 1013 based on the setting information from the image capturing apparatus 110, thereby implementing a desired analysis processing function. As for the analysis processing circuit information 1012 and the analysis processing set value 1013, one or a plurality of data can be stored in the storage unit 404 in correspondence with each analysis function. The authentication information 1011 is authentication information generated by the authentication information generation unit 1002 based on identification information specific to the detachable device 100 or identification information. The authentication information 1011 can be configured not to be accessed from the outside (for example, the image capturing apparatus 110). This can prevent an event in which an external apparatus unauthorizedly obtains the authentication information 1011 and succeeds authentication of an apparatus whose authentication should originally fail. In addition, the authentication information 1011 may be stored in, for example, a storage unit such as the volatile storage unit 1004, which is different from the storage unit 404. The volatile storage unit 1004 according to this embodiment is a volatile storage circuit formed in the FPGA, and stored information is cleared by resupply of power or reset processing from the outside.

Figure 11:
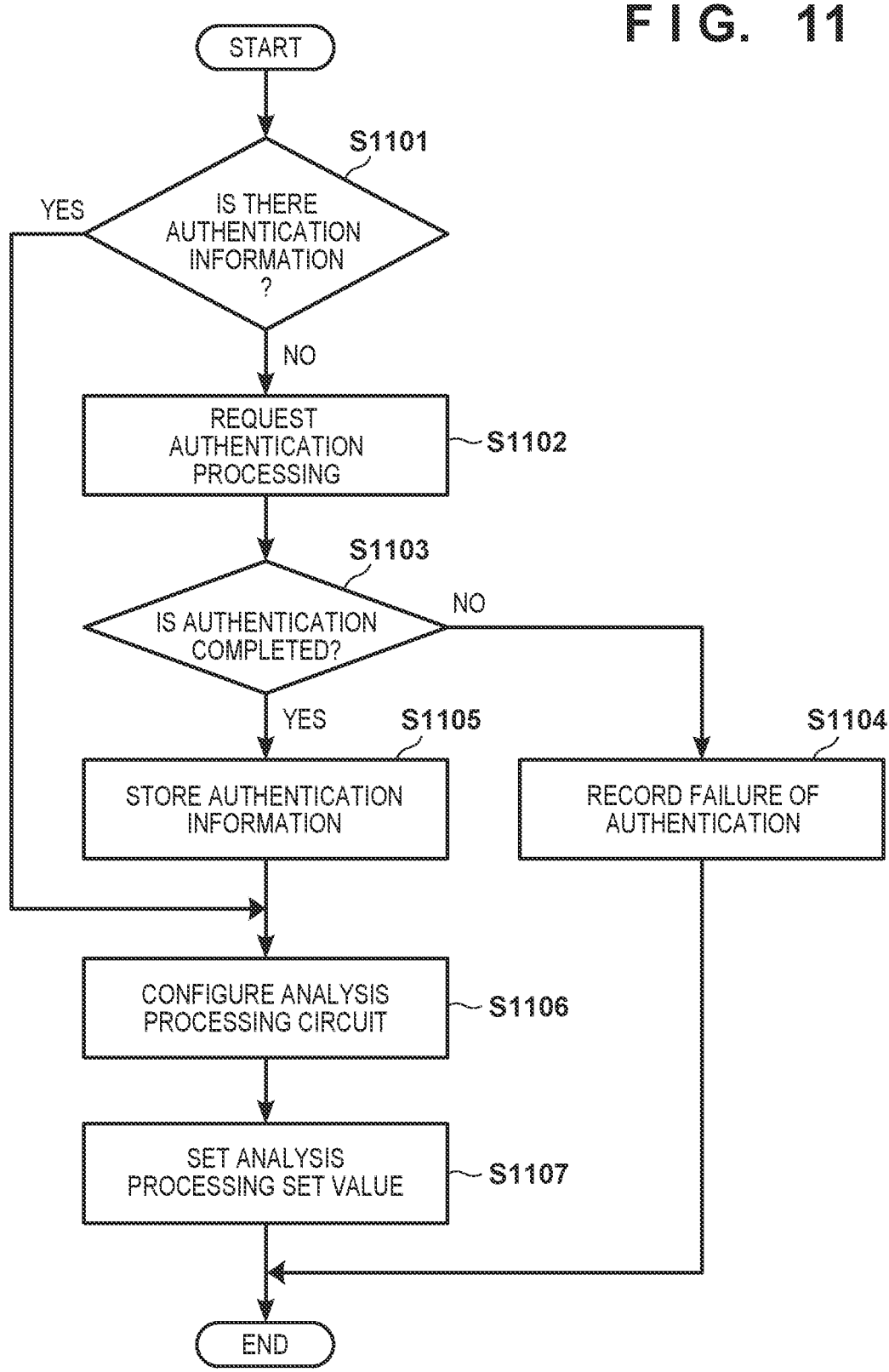
FIG. 11 is a flowchart showing an example of the procedure of control of executing authentication processing according to analysis processing.

An example of the procedure of authentication processing executed by the detachable device 100 at the time of activation will be described with reference to FIG. 11. This processing is executed after initialization of the detachable device 100 is completed. In some cases, this processing may be executed at the same time as the processing of transmitting information representing processing executable by the detachable device 100 to the image capturing apparatus 110 in step S903 of FIG. 9.

In this processing, first, the authentication information determination unit 1001 of the detachable device 100 determines whether authentication information concerning the image capturing apparatus 110 in which the detachable device 100 is mounted is stored in a predetermined area of the storage unit 404 (step S1101). This determination can be performed by, for example, obtaining information such as the identification information of the image capturing apparatus 110 and determining whether information corresponding to the information is stored. If authentication information for the image capturing apparatus in which the detachable device 100 is mounted is held (YES in step S1101), based on the authentication information, the storage control unit 1003 outputs analysis processing circuit information and an analysis processing set value to the arithmetic processing unit 412. Hence, in the detachable device 100, an analysis processing circuit is configured (step S1106), and the analysis processing set value is set (step S1107). Note that at the time of step S1101, it may only be determined whether authentication information is stored in a predetermined area of the storage unit 404. In this case, for example, the process advances to step S1106 based on the fact that some authentication information is stored in the predetermined area of the storage unit 404. At the time of this processing, the identification information of the image capturing apparatus 110 may be obtained, and it may be determined whether the authentication information of the image capturing apparatus 110 is stored. If authentication information concerning the image capturing apparatus 110 is not held, the process advances to a process to be executed when it is determined that authentication information does not exist in step S1101.

On the other hand, if authentication information concerning the image capturing apparatus 110 in which the detachable device 100 is mounted is not stored (NO in step S1101), the detachable device 100 transmits a request of authentication processing to the image capturing apparatus 110 to perform authentication (step S1102). Next, the detachable device 100 performs authentication with the image capturing apparatus 110 and determines whether authentication is completed (step S1.103). Details of an authentication method will be described later with reference to FIG. 12. If the authentication with the image capturing apparatus 110 is completed (YES in step S1103), the detachable device 100 stores the authentication result and the obtained authentication information in the storage unit 404 (step S1105). The authentication information stored here may be stored in the nonvolatile storage unit 404, or may be stored in the volatile storage unit 1004. The authentication information to be stored can be information including the authentication information including a password transmitted from the image capturing apparatus 110 and a list of analysis functions of authentication targets. When the authentication is completed, the detachable device 100 deploys an analysis circuit in the arithmetic processing unit 412 based on analysis processing designated by the image capturing apparatus 110 (step S1106), and sets the analysis processing set value in the logic circuit of the arithmetic processing unit 412 (step S1107). When the processing as described above is executed, the preparation of the detachable device 100 is completed, and the analysis processing function becomes executable.

Note that, for example, if the authentication with the image capturing apparatus 110 cannot be completed for a predetermined period (NO in step S1103), the detachable device 100 stores the failure of the authentication with the image capturing apparatus 110 in the storage unit 404 together with the identification information of the image capturing apparatus 110 (step S1104). In this case, the detachable device 100 completes activation without deploying the analysis processing circuit in the arithmetic processing unit 412. In this case, the detachable device 100 can be handled by the image capturing apparatus 110 as a device having only a storage function of storing information in the storage unit 404. At this time, information representing that all analysis processes cannot be executed may be stored in an analysis processing list stored in the storage unit 404. Note that some or all of the analysis processing functions held by the detachable device 100 can be changed to a usable state by, for example, executing authentication processing again in response to a request of authentication processing from the image capturing apparatus 110.

The procedure of authentication processing executed between the image capturing apparatus 110 and the detachable device 100 will be described next with reference to FIG. 12. This processing can be executed when the detachable device 100 is mounted in the image capturing apparatus 110 or when the power of the image capturing apparatus 110 is turned on. In this processing, the image capturing apparatus 110 reads out the identification information of the detachable device 100, the pieces of identification information of the detachable device 100 and the image capturing apparatus 110 are transmitted to management apparatus such as a server, and authentication information associated with an analysis processing function is obtained. The management apparatus is connected to the image capturing apparatus 110 and the input/output apparatus 130 via the network 120.

First, the detachable device 100 is mounted in the image capturing apparatus 110 by the user, and the detachable device 100 thus receives power supply and is activated (step S1201). The detachable device 100 determines whether authentication information concerning the image capturing apparatus 110 is held in a predetermined area of the storage unit 404 (step S1202). Upon detecting that the authentication information is not held in the storage unit 404, the detachable device 100 transmits an authentication request to the image capturing apparatus 110 (step S1203). Transmission of the authentication request may be done by including information (flag) representing the authentication request in a response to an initialization command from the image capturing apparatus 110. The authentication request may be transmitted by another method of, for example, including information (flag) representing the authentication request in a part of a response to a command for requesting a list of processes executable in the detachable device 100 in step S903 of FIG. 9.

When the authentication request from the detachable device 100 is obtained, the image capturing apparatus 110 transmits identification information corresponding to the image capturing apparatus 110 to the detachable device 100 (step S1204). The identification information of the image capturing apparatus 110 is information specific to each apparatus, for example, the MAC address of the image capturing apparatus 110, and this information is different even between apparatuses of the same type. The detachable device 100 prepares authentication base information based on the identification information of the self-device held in the self-device in advance and the identification information obtained from the image capturing apparatus 110, and stores the authentication base information in the storage unit 404 (step S1205). The authentication base information is information specific to the combination of the detachable device 100 and the image capturing apparatus 110, and different values (contents) are set for the combination of different devices. The authentication base information can be configured not to be accessed from the outside of the detachable device 100. The authentication base information can be generated as a binary value including, for example, identification information such as the serial number of the detachable device 100 and the identification information obtained from the image capturing apparatus 110. The detachable device 100 generates first authentication information based on the generated authentication base information (step S1206). For example, an operation is executed using at least a part of the authentication base information as an argument of a predetermined function, and the first authentication information is calculated as the value of the result of the operation. The detachable device 100 transmits the generated first authentication information and the information of the list of analysis functions held by the detachable device 100 to the image capturing apparatus 110 (step S1207).

The image capturing apparatus 110 sends, to a management apparatus designated by the detachable device 100, the obtained first authentication information and the list of analysis processing functions held by the detachable device 100, and selection information representing which analysis processing function is selected in the list (step S1208). Here, the management apparatus is formed by a server apparatus for managing authentication information, or the like, and is configured to manage analysis processing functions and authentication information for each identification information of the detachable device 100. The image capturing apparatus 110 is connected to the management apparatus via a network or the like. At this time, the management apparatus can be configured to allow the user to confirm the obtained list of analysis processing functions via, for example, the display unit 703 of the input/output apparatus 130. The information used to display the list of analysis processing functions may be provided to the input/output apparatus 130 via the image capturing apparatus 110, or may be provided by direct access of the input/output apparatus 130 to the management apparatus. The management apparatus executes authentication processing for the analysis processing function selected by the user (step S1209), and generates a list of authenticated analysis processes executable by the detachable device 100.

Here, the authenticated analysis processing can represent which one of the analysis processes selected based on the selection information provided to the management apparatus in step S1208 is authenticated. That is, not a result of authenticating all processes executable by the detachable device 100 but a result of performing authentication for processing requested by the image capturing apparatus 110 is output as authenticated analysis processing. For this reason, the authenticated analysis processing can be processing requested by the image capturing apparatus 110 and processing whose authentication has succeeded (for example, processing whose operation is confirmed in advance). Note that the authenticated analysis processing may be processing that has succeeded in authentication with the image capturing apparatus 110 in all processes that can be provided by the detachable device 100. For example, the image capturing apparatus 110 transmits, in the selection information transmitted in step S1208, information representing that all functions are selected, thereby obtaining such authenticated analysis processing.

The management apparatus generates second authentication information based on the received first authentication information and the authenticated analysis processing list after completion of the authentication processing (step S1210). The management apparatus transmits the generated second authentication information and the authenticated analysis processing list to the image capturing apparatus 110 (step S1211). The image capturing apparatus 110 stores the received second authentication information in the storage unit 303 (step S1212). Also, the image capturing apparatus 110 transmits the second authentication information and the authenticated analysis processing list obtained from the management apparatus to the detachable device 100 (step S1213).

The detachable device 100 generates third authentication information based on the authenticated analysis processing list received from the image capturing apparatus 110 and the first authentication information generated in step S1206, and compares it with the received second authentication information. The detachable device 100 determines, based on whether the second authentication information and the third authentication information match, whether the executed authentication processing is valid (step S1214). Here, the management apparatus generates the second authentication information based on the first authentication information and the authenticated analysis processing list, as described above. At this time, the management apparatus and the detachable device 100 use the same function as the function in which the first authentication information and the authenticated analysis processing list are applied as arguments to generate the second authentication information. Hence, if the second authentication information calculated by the self-device matches the second authentication information obtained in step S1213, the detachable device 100 can determine that the second authentication information obtained in step S1213 is valid. In addition, if the second authentication information calculated by the self-device does not match the second authentication information obtained in step S1213, the detachable device 100 can determine that the second authentication information obtained in step S1213 is invalid. Upon determining that the second authentication information is valid, the detachable device 100 stores the second authentication information in the storage unit 404 of the detachable device 100 (step S1215), and ends the authentication processing.

The second authentication information that the detachable device 100 stores in the storage unit 404 is specific information corresponding to the combination of the identification information of the image capturing apparatus 110, the specific information of the detachable device 100, and the authenticated analysis processing list. This allows the detachable device 100 to determine whether the image capturing apparatus 110 in which the self-device is mounted is a properly authenticated apparatus. In addition, based on the authenticated analysis processing list obtained from the image capturing apparatus 110 together with the second authentication information, if an unauthenticated analysis processing function is selected, the detachable device 100 can disable the function or inhibit selection of an un authenticated analysis processing function.

Note that the authentication base information used to generate the first authentication information is not limited to the above-described example. For example, the first authentication information may be generated by adding information including a validity term and a count as authentication base information. This makes it possible to define a period to use an analysis processing function and a use count. In addition, the detachable device 100 may store, in the volatile storage unit 1004, the identification information and the authentication information received from the image capturing apparatus 110. Hence, the authentication information stored in the detachable device 100 is erased every time the detachable device 100 is removed. Since authentication processing is executed every time power is supplied to the detachable device, it is possible to inhibit an analysis processing function from being carelessly provided to the unauthenticated image capturing apparatus 110.

An example of the procedure of processing when the image capturing apparatus after authentication is executed in the above-described way executes analysis processing will be described next with reference to FIG. 13. In this processing, first, the image capturing control unit 301 captures the peripheral environment (step S1301). The control unit 304 controls the signal processing unit 302 to process an image captured by the image capturing control unit 301 and obtain a captured image. After that, the control unit 304 controls the analysis unit 305 to execute pre-analysis processing for the captured image input from the control unit 304 and obtain the image of the pre-analysis processing result (step S1302). The control unit 304 determines whether the execution target processing is included in the authenticated analysis processing list, and generates transmission data including the image of the pre-analysis processing result and the second authentication information stored in the storage unit 303 (step S1303). The control unit 304 controls the device communication unit 306 to transmit the generated transmission data to the detachable device 100 (step S1304). For example, the control unit 304 issues a pre-analysis processing result write request (write command), thereby transmitting the image of the pre-analysis processing result to the detachable device 100. The communication unit 502 of the detachable device 100 receives the image of the pre-analysis processing result from the image capturing apparatus 110, and outputs the image received from the image capturing apparatus 110 to the analysis unit 501. The analysis unit 501 of the detachable device 100 executes the set execution target processing for the image input from the communication unit 502 (step S1305). The communication unit 502 of the detachable device 100 transmits an analysis processing result obtained by processing of the analysis unit 501 to the image capturing apparatus 110 (step S1306). The control unit 304 of the image capturing apparatus 110 controls the device communication unit 306 to receive the analysis processing result from the detachable device 100. After that, the control unit 304 controls the analysis unit 305 to execute post-analysis processing for the analysis processing result (step S1307). The post-analysis processing can be, for example, analysis result storage processing or display processing.

Transmission of the analysis processing result from the detachable device 100 to the image capturing apparatus 110 is done, for example, in the following way. The analysis unit 501 of the detachable device 100 stores the analysis processing result at the storage destination address for the analysis processing result, which is assigned for each execution target processing. The image capturing apparatus 110 reads out information representing the storage address of the analysis processing result, which is stored at the address A together with, for example, the second processing list, and issues a read request (read command) for the storage address. The detachable device 100 receives the read request for the storage address of the analysis processing result via the communication unit 502, and outputs the analysis processing result to the image capturing apparatus 110. Note that the image capturing apparatus 110 can issue the read request for the storage address of the analysis processing result, for example, after the elapse of an estimated processing time stored at the address A. In addition, the detachable device 100 may output a BUSY signal from the write request of the last block of the pre-analysis processing result transmitted from the image capturing apparatus 110 to the end of the execution target processing. In this case, the image capturing apparatus 110 can issue the read request for the storage address of the analysis processing result when the BUSY signal is not received any more. This allows the image capturing apparatus 110 to obtain the processing result after the end of the processing. If the detachable device 100 disables an analysis processing function, information representing that the analysis processing function is disabled may be stored at a predetermined address such as the address A or the analysis processing result storage address. The detachable device 100 can store such information at a predetermined address if the second authentication information received from the image capturing apparatus 110 in step S1304 does not match the second authentication information held in the self-device, or if authentication processing is not performed for the execution target processing. The image capturing apparatus 110 reads out the data at the predetermined address, thereby recognizing that the transmitted second authentication information does not match the second authentication information held in the detachable device 100, or that authentication processing is not performed for the execution target processing.

Communication between the image capturing apparatus 110 and the detachable device 100 will be described here. The arithmetic processing unit 203 of the image capturing apparatus 110 and the SD controller 403 of the detachable device 100 are connected by a power supply line, a GND line, a clock line, a command line, and a data line via the device insertion socket of the SD I/F unit 205 of the image capturing apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 identifies whether a device detect signal of the device insertion socket of the SD I/F unit 205 is High and Low, thereby recognizing whether the detachable device 100 is inserted.

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Figure 14A:
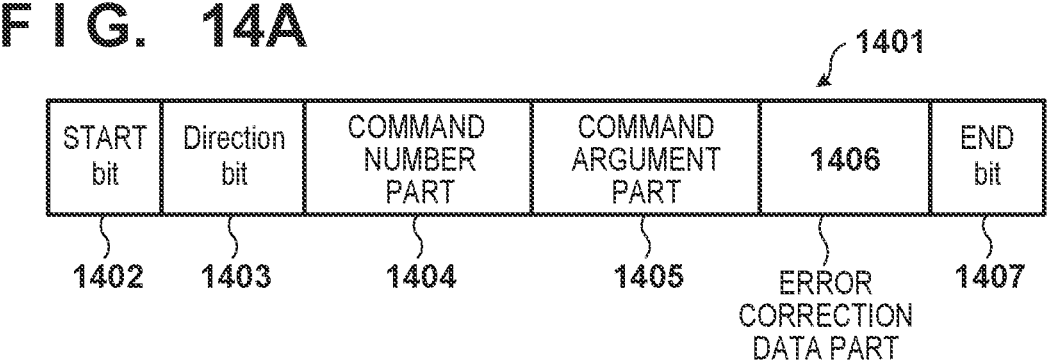
FIGS. 14A to 14D are views schematically showing examples of the data structures of a command and a response when performing image analysis processing and authentication processing.
Figure 14B:
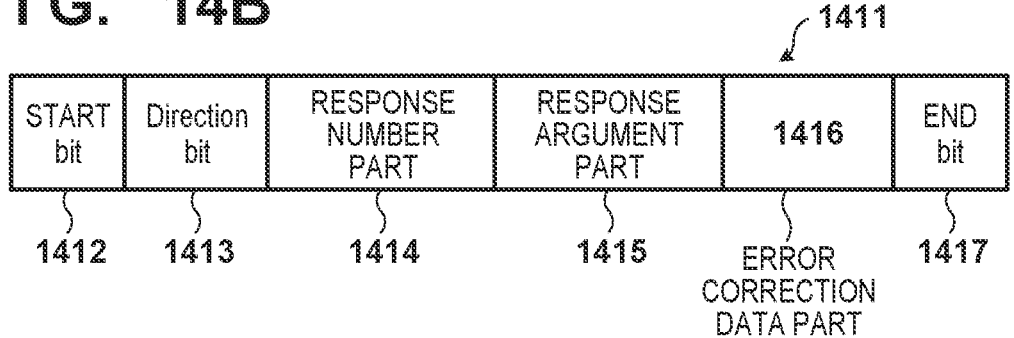

FIGS. 14A and 14B show the structures of a command and a response communicated on the command line. The command and response have structures complying with the SD standard. A command 1401 issued from the arithmetic processing unit 203 to the SD controller 403 is configured to include a command number part 1404, a command argument part 1405, and an error correction data part 1406. In the command number part 1404, a value indicating the type of the command is described. For example, if a value "23" is stored in the command number part 1404, this indicates that the command is a block count designation command for designating the number of data blocks. If a value "25" is stored in the command number part 1404, this indicates that the command is a multi-write command. If a value "12" is stored in the command number part 1404, this indicates that the command is a data transfer stop command. In the command argument part 1405, pieces of information such as the number of transfer data blocks and the write/read address of a memory are designated in accordance with the type of the command. A command start bit 1402 representing the start position of the command is added to the first bit of the command, and a command end bit 1407 representing the end of the command is added to the final bit of the command. Additionally, a direction bit 1403 representing that the command is a signal output from the image capturing apparatus 110 to the detachable device 100 is also added after the command start bit 1402.

A response 1411 returned from the SD controller 403 in response to the command from the arithmetic processing unit 203 includes a response number part 1414 representing for which command the response is returned, a response argument part 1415, and an error correction data part 1416. A response start bit 1412 representing the start position of the response is added to the first bit of the response, and a response end bit 1417 representing the end position of the response is added to the final bit of the response. Additionally, a direction bit 1413 representing that the response is a signal output from the detachable device 100 to the image capturing apparatus 110 is also added after the response start bit 1412. In the response argument part 1415, pieces of information such as the status of the SD card are stored in accordance with the command type.

Figure 14C:
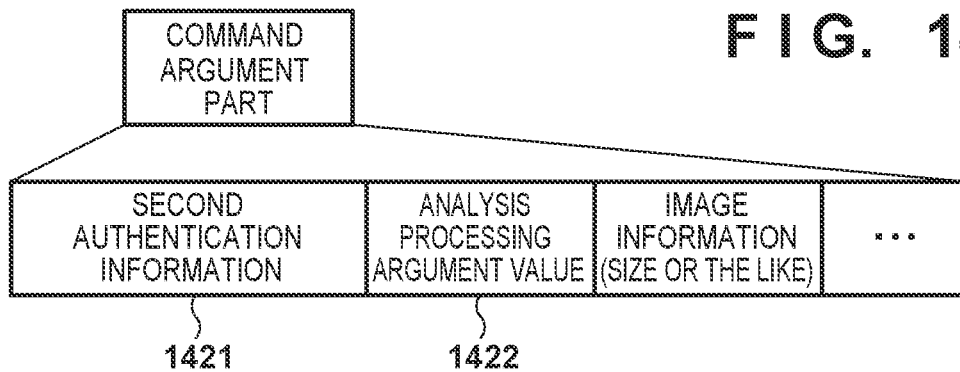

FIG. 14C shows an example of the contents of the command argument part 1405 in the command 1401 that is transmitted from the image capturing apparatus 110 to the detachable device 100 when requesting an analysis processing function. In the structure shown in FIG. 14C, the command argument part 1405 is configured to include second authentication information 1421, an analysis processing argument value 1422 indicating an execution target analysis processing function or the like, and information representing image information such as the size of a processing target image. Note that FIG. 14C is merely an example, and a dedicated command number used to execute an analysis processing function may be prepared and stored in the command number part 1404. That is, the command argument part 1405 may be configured as shown in FIG. 14C to use a protocol defined by the conventional SD standard, or a new protocol that does not exist in the conventional SD standard and can execute the same processing may be defined. In the new protocol, for example, the command number part 1404 of an analysis processing request command for requesting an analysis processing function may include the second authentication information and an argument value indicating an execution target analysis processing function.

Figure 14D:
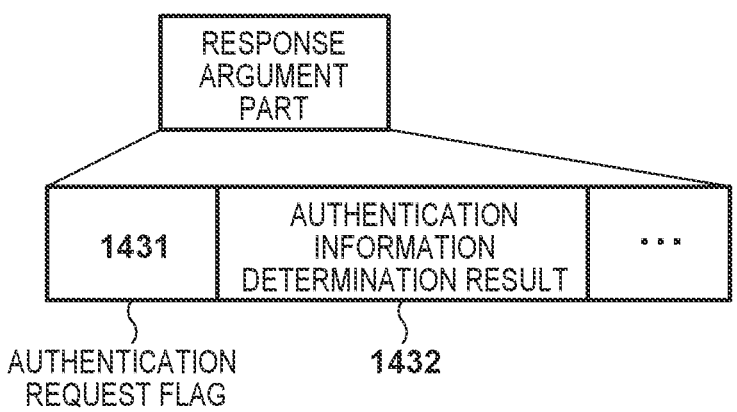

FIG. 14D shows an example of the contents of the response argument part 1415 in the response 1411 that is transmitted for the analysis processing request command from the detachable device 100 to the image capturing apparatus 110. In the structure shown in FIG. 14D, the response argument part 1415 includes, for example, an authentication request flag 1431 and an authentication information determination result 1432. As described concerning step S1203, the authentication request flag 1431 is configured to store a predetermined value (for example, "1") in the response to the initialization command from the image capturing apparatus 110 when requesting authentication to the image capturing apparatus 110. Also, even if pieces of authentication information do not match, and it is determined that the detachable device 100 needs to reauthenticate the image capturing apparatus 110, a predetermined value is set in the authentication request flag 1431, and authentication can be requested to the image capturing apparatus 110. The authentication information determination result 1432 can be used to notify the image capturing apparatus 110 of the result of processing or the status of processing to the analysis processing request command.

Note that FIGS. 14A to 14D show an example in a case in which the operation is performed in accordance with the SD standard. Similar processing can be executed even in a communication standard other than this. That is, in a predetermined standard, a command transmitted/received between the image capturing apparatus 110 and the detachable device 100 can include second authentication information, an analysis processing argument value, an authentication request flag, an authentication information determination result, and the like. It is thus possible to obtain the same effect as in a case in which the structures as shown in FIGS. 14A to 14D are used in the SD standard.

Figure 15:
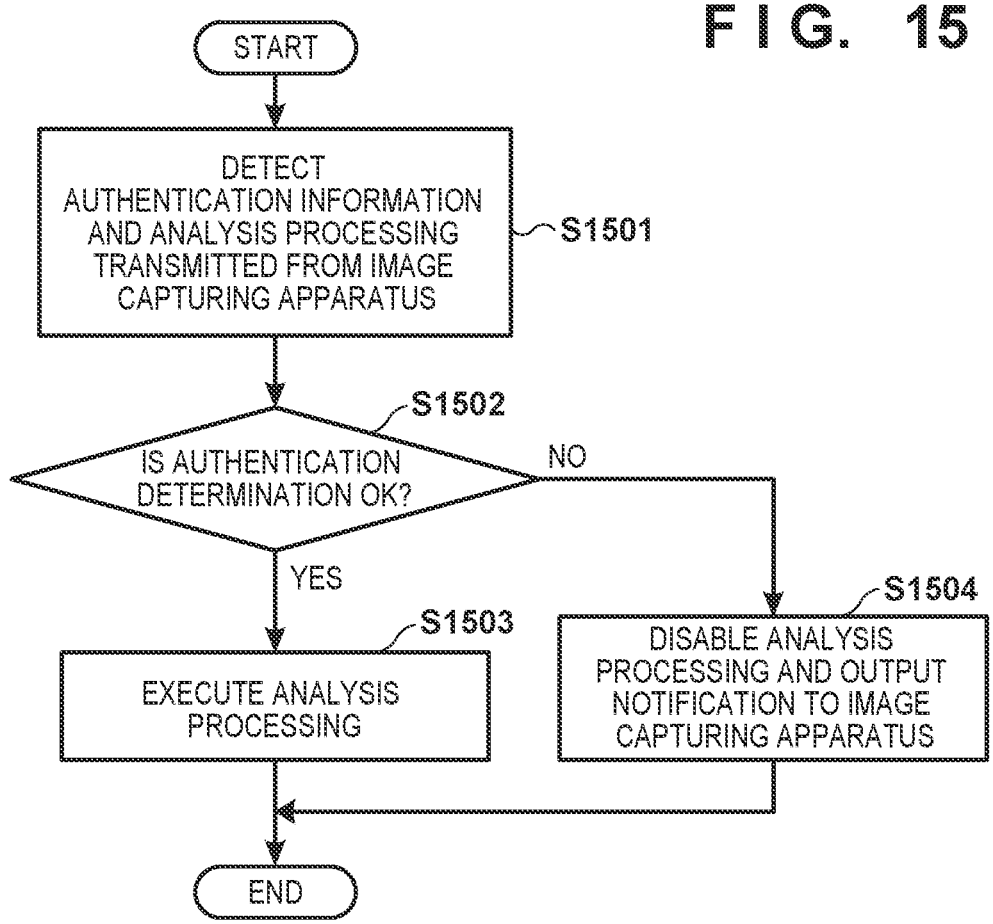
FIG. 15 is a flowchart showing an example of the procedure of processing of the detachable device to disable analysis processing.

An example of the procedure of processing of the detachable device 100 to perform authentication determination for an analysis processing request from the image capturing apparatus 110 will be described next with reference to FIG. 15. Every time an analysis processing request command is received from the image capturing apparatus 110, the detachable device 100 executes processing shown in FIG. 15 and performs authentication determination processing for execution target analysis processing.

In this processing, first, the arithmetic processing unit 203 of the image capturing apparatus 110 issues an analysis processing request command and transfers data to the detachable device 100. By the analysis processing request command, the authentication information determination unit 1001 of the detachable device 100 detects the second authentication information 1421 and the analysis processing argument value 1422 (step S1501). After that, the authentication information determination unit 1001 executes authentication determination processing for the data received from the image capturing apparatus 110 (step S1502). For example, the authentication information determination unit 1001 calculates third authentication information based on the value of the authenticated analysis processing list obtained when authentication is executed with respect to the image capturing apparatus 110, as shown in FIG. 12 and internally stored first authentication information. If the second authentication information 1421 received from the image capturing apparatus 110 and the newly calculated third authentication information match, the authentication information determination unit 1001 determines that authentication has succeeded. Also, the authentication information determination unit 1001 determines that an analysis processing function indicated by the analysis processing argument value 1422 received from the image capturing apparatus 110 is analysis processing included in the authenticated analysis processing list. Upon determining that the pieces of authentication information match and determining that the analysis processing function indicated by the analysis processing argument value 1422 is included in the authenticated analysis processing list, the authentication information determination unit 1001 determines that authentication has succeeded.

If authentication has succeeded (YES in step S1502), the detachable device 100 reads out the analysis processing circuit information 1012 instructed by the image capturing apparatus 110 from the storage unit 404, and deploys it in the arithmetic processing unit 412. Using the analysis processing set value 1013 instructed by the image capturing apparatus 110, the detachable device 100 performs setting for the analysis processing circuit and executes analysis processing (step S1503). For example, to hierarchically arithmetically process received image data, the start address value of the storage unit 404 that stores a set value indicating an arithmetic processing sequence and a coefficient value to be used for arithmetic processing of each layer is set in the storage control unit 1003. The storage control unit 1003 transmits the analysis processing set value 1013 at the set address to the arithmetic processing unit 412. The arithmetic processing unit 412 notifies the storage control unit 1003 of a completion notification every time arithmetic processing of each layer ends, and the storage control unit 1003 sequentially reads out the set value of arithmetic processing and sets it in the arithmetic processing unit 412. Note that the series of process is merely an example, and analysis processing may be executed in accordance with another procedure.

On the other hand, upon determining that the pieces of authentication information do not match and determining that the analysis processing function indicated by the analysis processing argument value 1422 is not included in the authenticated analysis processing list, the authentication information determination unit 1001 determines that authentication has failed. If authentication has failed (NO in step S1502), the detachable device 100 disables the analysis processing function. For example, control is executed to delete the address of the analysis processing set value 1013 set in the storage control unit 1003 and inhibit the analysis processing set value 1013 from being set in the arithmetic processing unit 412. Since the arithmetic processing unit 412 stops the operation because the set value is not set in the FPGA of the arithmetic processing unit 412, the analysis processing function is disabled (step S1504). Note that the analysis processing function may be disabled in accordance with a procedure different from the above-described procedure. For example, if the authentication information determination unit 1001 determines that authentication has failed, circuit information set in the FPGA of the arithmetic processing unit 412 may be reset (for example, by the storage control unit 1003). Also, if the authentication information determination unit 1001 determines that authentication has failed, activation of the FPGA of the arithmetic processing unit 412 may be inhibited. Note that the FPGA is an example, and if an arbitrary reconfigurable device is used in place of the FPGA, such a disabling method can be applied. That is, the analysis processing function can be disabled by processing of inhibiting application of the set value to the reconfigurable device, resetting circuit information constituted in the reconfigurable device, or inhibiting activation of the reconfigurable device. In addition, image data transmitted in accordance with the analysis processing request command may be inhibited from being transferred to the arithmetic processing unit 412. In this case, the image data can directly be stored in, for example, the storage unit 404. Also, for example, a processing result obtained by transferring the image data to the arithmetic processing unit 412 may be discarded. That is, disabling of the analysis processing function in this embodiment is intended to set the image capturing apparatus 110 in a state in which it cannot obtain the data of a processing result, and the analysis processing function itself may be valid. Furthermore, the authentication information determination unit 1001 can transmit, to the image capturing apparatus 110, a response including information representing that the designated analysis processing is invalid (step S1504).

Note that, for example, if authentication is not performed for the analysis processing function requested from the image capturing apparatus 110, the pieces of authentication information do not match, and the detachable device 1X) determines that authentication has failed. In an example, if an analysis processing function that is not authenticated for the image capturing apparatus 110 is designated in the analysis processing functions held by the detachable device 100, the detachable device 100 determines that authentication has failed. In this case, the detachable device 100 can transmit, to the image capturing apparatus 110, the authentication information determination result 1432 including, for example, information representing that authentication has not been executed for the requested analysis processing. In this case, for example, if a request of analysis processing is received again after authentication is executed by executing, by the user, a predetermined operation to execute authentication of the image capturing apparatus 110, analysis processing is executed based on the success of the authentication.

On the other hand, if the image capturing apparatus 110 in which the self-device is mounted is not an authenticated image capturing apparatus, the detachable device 100 determines that authentication has failed. The detachable device 100 makes such a determination if, for example, a first image capturing apparatus issues an analysis processing request using authentication information authenticated by a second image capturing apparatus in a state in which the detachable device is mounted in a first image capturing apparatus. If the image capturing apparatus 110 with which the detachable device is communicating is not an authenticated image capturing apparatus, the detachable device 100 deletes the analysis processing circuit deployed in the arithmetic processing unit 412 and disables the analysis processing function. In this case, since the image capturing apparatus 110 that requests analysis processing is an unauthorized apparatus, it is not caused to execute processing. In this case, the detachable device 100 can transmit, to the image capturing apparatus 110, the authentication information determination result 1432 including, for example, information representing that the requested analysis processing cannot be executed. Also, the detachable device 100 may register, in a black list, information for specifying the image capturing apparatus 110 in which the device is currently mounted and inhibit acceptance of an analysis processing request by the image capturing apparatus 110 unless a predetermined user operation is performed later. In addition, for the second authentication information included in the analysis processing request, information such as the authenticated analysis processing list may deleted. If information leaks, it is possible to prevent the leaked information from being used again. As described above, if authentication has failed, a different analysis processing disabling processing method may be used for each reason of failure.

When it is determined, by the above-described authentication determination, whether the image capturing apparatus 110 in which the detachable device 100 is mounted is an authenticated apparatus, the analysis processing function can be provided only to, for example, an apparatus whose operation is confirmed. Also, at this time, more flexible control can be performed by determining, for each requested analysis processing, whether the apparatus is authenticated. For an image capturing apparatus that is unauthenticated for execution target analysis processing, the detachable device 100 disables the function of the analysis processing, thereby using the function in an appropriate environment.

Note that in an example, an analysis processing request command that is not associated with record processing is transmitted to the processing switching unit 411 after the input/output control unit 410 determines that the command is not a command associated with record processing, and is not transmitted to the SD controller 403. On the other hand, a command that is not associated with record processing is transmitted to the SD controller 403 and it not transmitted to the processing switching unit 411 or the arithmetic processing unit 412. Here, even in a case in which authentication has failed, it is only the analysis processing function that is disabled. For this reason, if the detachable device 100 has a storage processing function, storage processing can be executed like a general SD card independently of whether authentication has succeeded/failed. To perform storage processing, the FPGA 402 inputs a command and data received from the image capturing apparatus 110 directly to the SD controller 403, and the SD controller 403 stores the received data at an address of the storage unit 404 designated by the command. To perform image analysis processing, data received from the image capturing apparatus 110 is input from the FPGA 402 to the arithmetic processing unit 412, and the arithmetic processing unit 412 executes analysis processing for the data. The data processed by the arithmetic processing unit 412 is returned to the input/output control unit 410, and the data of the processing result and information for designating a predetermined address of the storage unit 404 are output to the SD controller 403. The SD controller 403 stores the processing result at the designated address of the storage unit.

In this way, the transfer destination of received data is automatically switched in accordance with whether a command is associated with record processing, and appropriate processing can be executed. If an image analysis request command is received, and authentication concerning the requested image processing succeeds, the received data is input to the arithmetic processing unit 412. On the other hand, if authentication concerning the requested image processing fails, the received data is input not to the arithmetic processing unit 412 but to the SD controller 403 and stored in the storage unit 404. In this way, subsequent processing for input data can be switched depending on the success/failure of authentication in addition to the command type.

Note that in the above-described embodiment, authentication determination processing using an analysis processing request command has been described. However, the present invention is not limited to this. For example, the analysis processing request may be transmitted/received using data transferred on the data line. For example, the analysis processing request including second authentication information as described above may be transmitted/received in data at a predetermined position such as the start data of image data to be transmitted. In this case, the detachable device 100 can obtain the second authentication information and the analysis processing argument value from the data at the predetermined position and execute authentication processing as described above.

Figure 16:
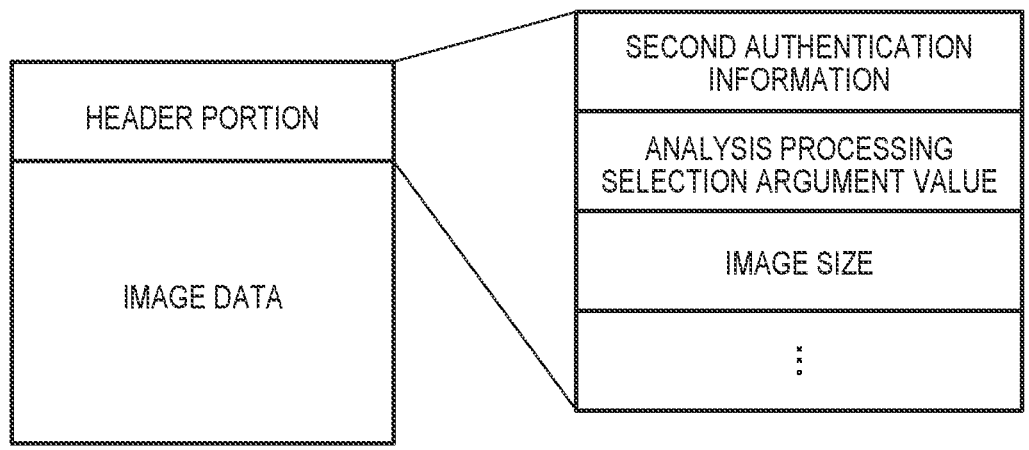
FIG. 16 is a view schematically showing an example of the structure of image data including information concerning authentication.

FIG. 16 shows an example of the structure of image data including authentication information and an analysis processing argument value. Note that the example shown in FIG. 16 is merely an example, and a structure other than this may be used. In the example shown in FIG. 16, data includes a header portion and image data. The header portion includes second authentication information, an argument value (analysis processing selection argument value) indicating analysis processing requested by the image capturing apparatus, and values indicating an image size and the like. Upon receiving image data from the image capturing apparatus 110, the detachable device 100 analyzes the header in the received image data and detects second authentication information. The detachable device 100 executes authentication processing using the detected second authentication information in the above-described way, and upon determining that authentication has succeeded, performs the analysis processing for the received image data. On the other hand, if authentication has failed, the detachable device 100 can determine that the analysis processing request is invalid for image data including the second authentication information in the header portion and following image data, and decide not to perform analysis processing.

An example of analysis processing information stored in the storage unit 404 of the detachable device 100 will be described next with reference to FIGS. 17A to 17C. A memory map 1701 shown in FIG. 17A includes the information of addresses at which pieces of information are stored. In the example shown in FIG. 17A, addresses at which authentication information 1702, an analysis processing list 1703, pieces of analysis processing circuit information 1704, and analysis processing set values 1705 are stored are shown.

An authenticated analysis processing list as shown in FIG. 17B is stored in the storage area (that is, the storage area in a predetermined range started from an address AD1) of the analysis processing list 1703 shown in FIG. 17A. In the authenticated analysis processing list, a number 1711 is a serial number assigned to each information of analysis processing held by the detachable device 100. A type 1712 indicates the type of the information of analysis processing held by the detachable device 100, and a value that enables discrimination of whether the information is analysis processing circuit data or an analysis processing set value is stored. An address represents an address of the storage unit 404 at which each information is stored. The storage control unit 1003 executes read of an analysis processing set value based on the value of the address. Note that as an example, information 1713 including the number 1711 and the type 1712 is transmitted as an analysis processing list to the image capturing apparatus 110 at the time of authentication. Authentication flags 1714 and 1715 represent, for each authenticated analysis processing function, whether authentication has been done between the detachable device 100 and the apparatus (image capturing apparatus) in which the detachable device 100 is mounted. If the flag is set to "1", it indicates that the analysis processing function has already been authenticated. In the example shown in FIG. 17B, for an apparatus A, analysis processing using circuit information of numbers 0002 and 0004 and set values of numbers 0006 and 0007 is shown as an authenticated analysis processing function. The authentication flags are configured to be stored for each of a plurality of apparatuses in which the detachable device is mounted, as shown in FIG. 17B. However, this is merely an example. For example, if information is cleared at the time of removal of the detachable device 100, holding information only for the apparatus in which the detachable device is currently mounted suffices. Hence, it is unnecessary to hold information for a plurality of apparatuses. Additionally, if authentication is executed for the apparatus in which the detachable device is currently mounted, the detachable device 100 may overwrite information based on the result of authentication for an apparatus in which the detachable device was mounted previously by the information obtained as the result of authentication.

Figure 17C:
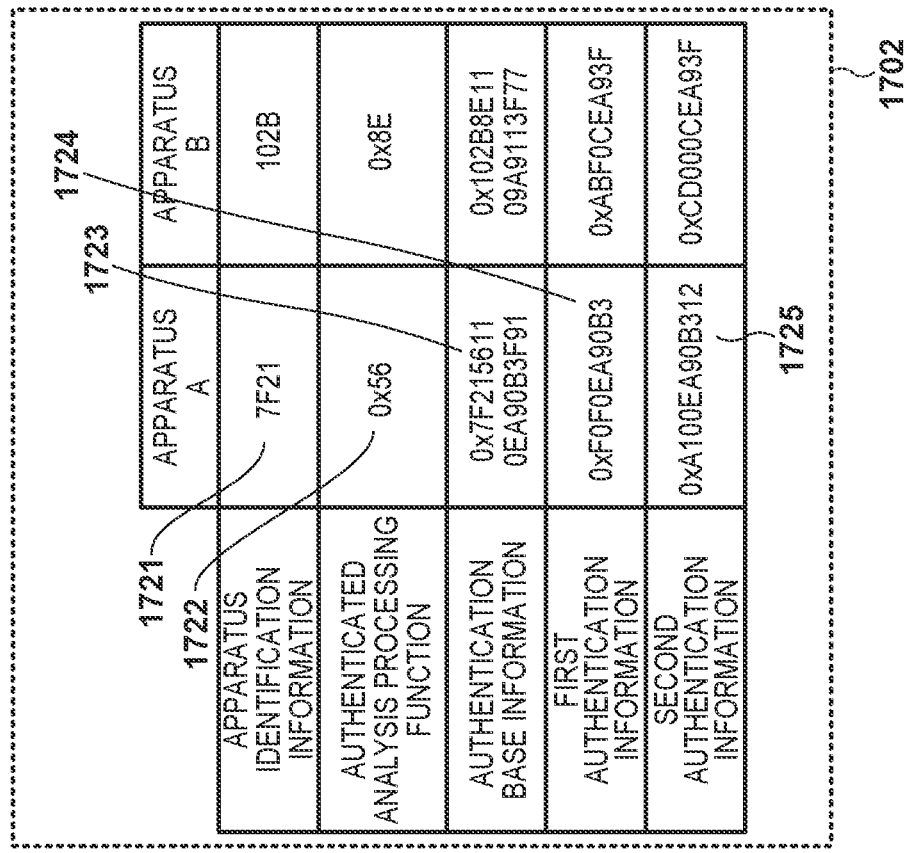

Authentication information as shown in FIG. 17C is stored in the storage area (that is, the storage area in a predetermined range started from an address AD0) of the authentication information 1702 shown in FIG. 17A. The authentication information 1702 includes values used when performing authentication with the apparatus in which the detachable device 100 is mounted. In an example, the authentication information 1702 can be stored in a storage area that cannot be accessed from the apparatus in which the detachable device 100 is mounted. For this reason, the detachable device 100 is configured to, for example, store these values in the volatile storage unit 1004 in the FPGA after the values are calculated by the authentication information generation unit 1002. This can prevent an external apparatus from reading information from the detachable device 100 and unauthorizedly succeeding in authentication. The stored values are, for example, argument values indicating apparatus identification information 1721 and authenticated analysis processing function 1722, authentication base information 1723, first authentication information 1724, and second authentication information 1725 for each apparatus in which the detachable device 100 is mounted.

At the time of an authentication request to the apparatus A in which the detachable device 100 is mounted, the authentication information generation unit 1002 of the detachable device 100 generates the authentication base information 1723 based on the apparatus identification information 1721 obtained from the apparatus A and authentication information held by the detachable device 100. The authentication information generation unit 1002 also generates the first authentication information 1724 based on the authentication base information 1723 and transmits it to the apparatus A. The first authentication information 1724 can be, for example, a value calculated by inputting a value that combines binary values stored in the storage areas to a predetermined function. After that, upon receiving the second authentication information from the apparatus (for example, the image capturing apparatus) in which the self-device is mounted, the detachable device 100 executes authentication based on the second authentication information. The detachable device 100 executes arithmetic processing by, for example, inputting information including the transmitted first authentication information 1724 and an authenticated analysis processing function to the same function as the function held by the management apparatus, thereby generating third authentication information. The detachable device 100 compares the generated third authentication information with the received second authentication information, thereby determining whether the apparatus to which the self-device is connected is an authenticated apparatus. Note that the detachable device 100 may, for example, calculate and hold a value (the second authentication information 1725 shown in FIG. 17C) corresponding to the second authentication information in advance. According to this, upon receiving the second authentication information from the apparatus in which the detachable device 100 is mounted, the detachable device 100 can execute authentication only by comparing the second authentication information with the held information.

Note that when the detachable device 100 periodically requests the apparatus in which the detachable device is mounted to transmit authentication information, and fails in authentication based on authentication information obtained in response to the request, the analysis processing function can be disabled. Note that the transmission/reception of the authentication information transmission request command can be done using, for example, a new protocol that allows the detachable device 100 to spontaneously transmit a command. Processing of the detachable device 100 to request authentication information again from the apparatus (image capturing apparatus 110) in which the self-device is mounted will be described with reference to FIG. 18.

Figure 18:
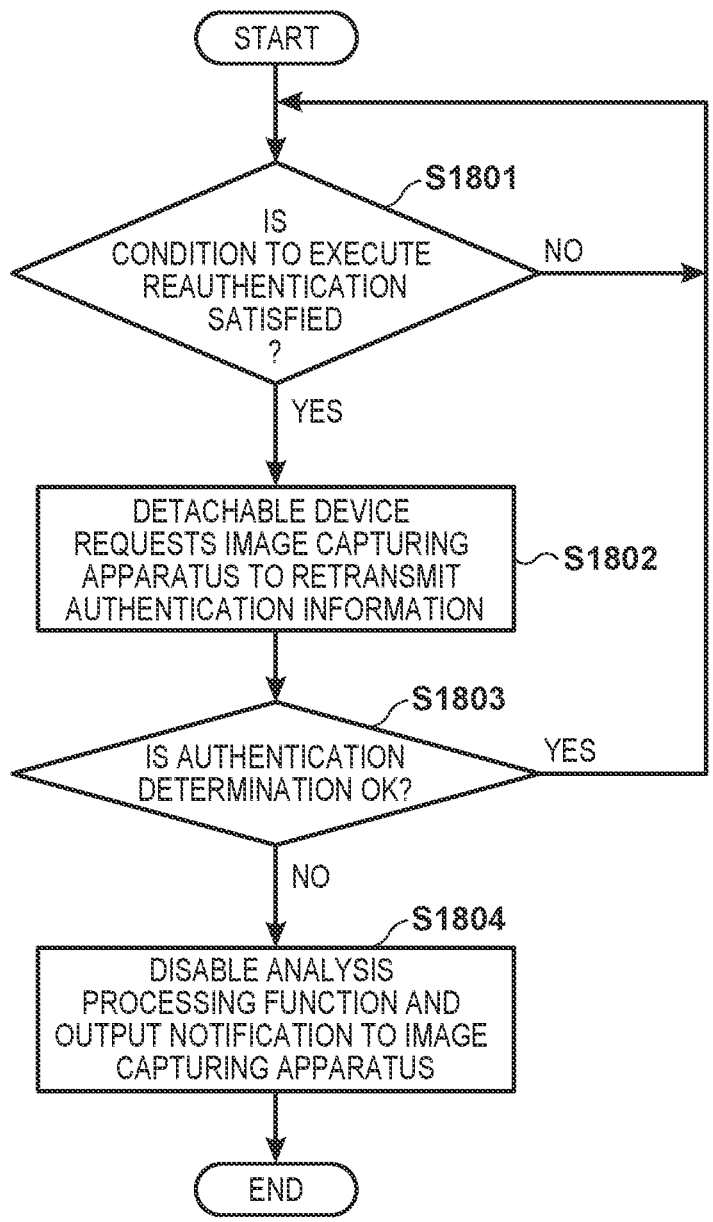
FIG. 18 is a flowchart showing an example of the procedure of processing in a case in which the detachable device executes reauthentication processing.

In processing shown in FIG. 18, the detachable device 100 first determines whether a condition to execute reauthentication is satisfied (step S1801). The condition to execute reauthentication can be, for example, that the predetermined time has elapsed after the success of the authentication or that the number of times of execution of analysis processing exceeds a predetermined number of times after the success of the authentication. Upon determining that the condition to execute reauthentication is not satisfied (NO in step S1801), the detachable device 100 continues the current operation based on previous authentication until the condition is satisfied. On the other hand, upon determining that the condition to execute reauthentication is satisfied (YES in step S1801), the detachable device 100 requests the image capturing apparatus 110 to retransmit authentication information (step S1802). For example, if the condition to execute reauthentication is the elapse of a predetermined time, the detachable device 100 detects the elapse of the predetermined time using an internal timer circuit, and transmits an authentication information retransmission request command to the image capturing apparatus 110 even if a command is not received from the image capturing apparatus 110. The authentication information request is sent by, for example, the command line of the SD I/F. In an example, a command is transmitted in a data format similar to that of the response 1411 as shown in FIG. 14B. Also, a response from the image capturing apparatus 110 to the authentication information retransmission request can be transmitted in a data format similar to that of the command 1401 as shown in FIG. 14A. That is, in an example, request and transmission of authentication information can be performed in a form in which the transmission order of the command and the response in FIGS. 14A and 14B is reversed. Upon receiving a response (analysis request command) of reauthentication from the image capturing apparatus 110 based on the authentication information request, the detachable device 100 executes authentication based on second authentication information included in the response (step S1803). If authentication succeeds (YES in step S1803), the detachable device 100 returns the process to step S1801. At this time, the detachable device 100 can clear the measurement value (the time or the number of times of execution of analysis processing) concerning the condition to execute reauthentication. After that, the detachable device 100 sets the processing shown in FIG. 18 in a standby state until the condition to execute reauthentication is satisfied again. For example, if the image capturing apparatus 110 does not return second authentication information in response to the authentication information request, or authentication by the second authentication information fails (NO in step S1803), the detachable device 100 advances the process to step S1804. In step S1804, the detachable device 100 determines that the image capturing apparatus 110 in which the detachable device is mounted is not an authenticated apparatus, and disables the analysis processing function. The processing shown in FIG. 18 is then ended.

Figure 19:
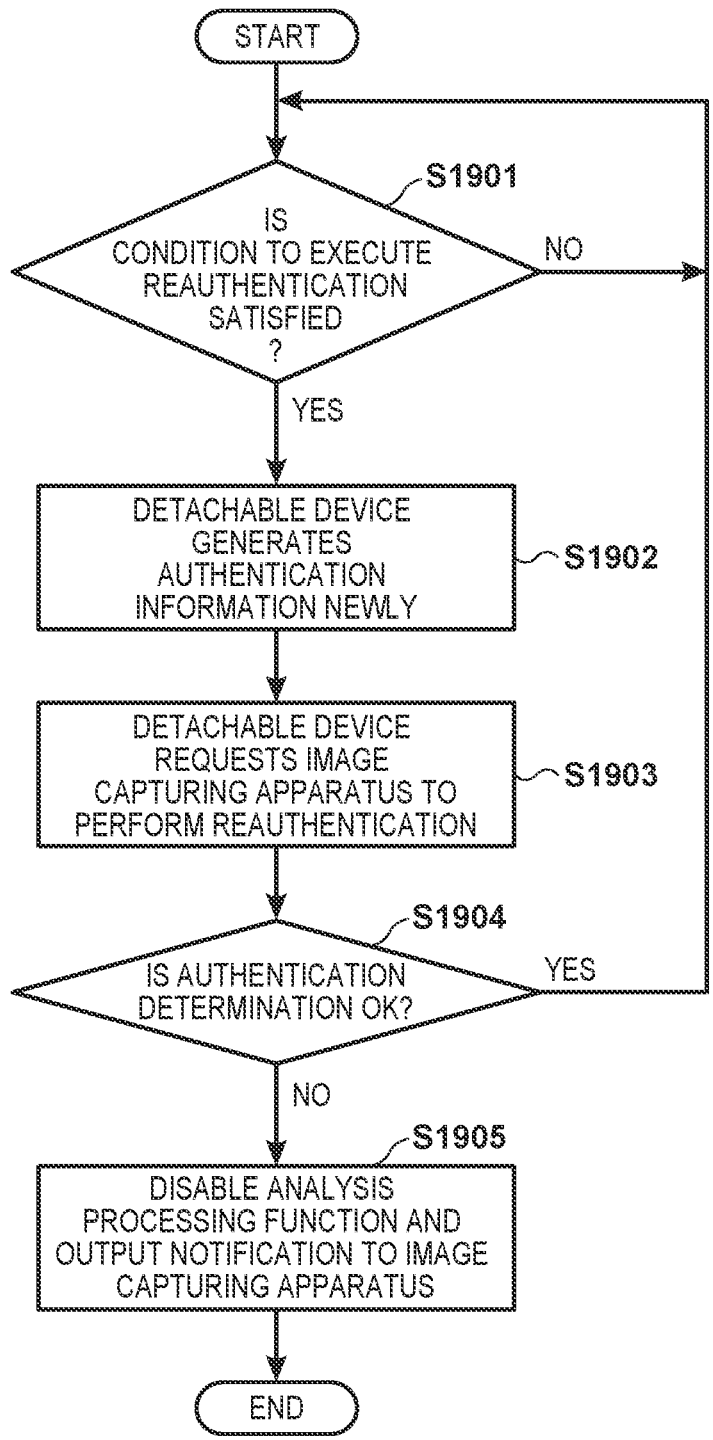
FIG. 19 is a flowchart showing an example of the procedure of processing in a case in which the detachable device executes reauthentication processing.

Another process of the detachable device 100 to request authentication information from the apparatus (image capturing apparatus 110) in which the self-device is mounted will be described with reference to FIG. 19. In processing shown in FIG. 19 as well, the detachable device 100 first determines whether a condition to execute reauthentication is satisfied (step S1901). This processing is similar to step S1801. Upon determining that the condition to execute reauthentication is not satisfied (NO in step S1901), the detachable device 100 continues the current operation based on previous authentication until the condition is satisfied. On the other hand, upon determining that the condition to execute reauthentication is satisfied (YES in step S1901), the detachable device 100 generates fourth authentication information that has a characteristic similar to the first authentication information transmitted to the image capturing apparatus 110 but is different (step S1902). The detachable device 100 transmits the fourth authentication information to the image capturing apparatus 110 and requests authentication processing again (step S1903). Since the fourth authentication information is different from the previously transmitted first authentication information, the image capturing apparatus 110 transmits the newly generated fourth authentication information to the management apparatus, and newly obtains fifth authentication information having a characteristic similar to the second authentication information. Upon obtaining the fifth authentication information that is the result of transmitting the fourth authentication information to the management apparatus and performing authentication processing, the image capturing apparatus 110 transmits the fifth authentication information to the detachable device 100. Upon obtaining the fifth authentication information, the detachable device 100 executes authentication processing again based on the fifth authentication information (step S1904). Upon determining that authentication succeeds (YES in step S1904), the detachable device 100 returns the process to step S1901. At this time, the detachable device 100 can clear the measurement value (the time or the number of times of execution of analysis processing) concerning the condition to execute reauthentication. After that, the detachable device 100 sets the processing shown in FIG. 19 in a standby state until the condition to execute reauthentication is satisfied again. If authentication by the fifth authentication information fails (NO in step S1903), the detachable device 100 advances the process to step S1904. In step S1904, the detachable device 100 determines that the image capturing apparatus 110 in which the detachable device is mounted is not an authenticated apparatus, and disables the analysis processing function.

As described above, if authentication information cannot be obtained from the image capturing apparatus 110 or the pieces of authentication information do not match, the detachable device 100 determines that the connected image capturing apparatus 110 is a spoofer using the authentication result of another apparatus in the past, and disables analysis processing. This can prevent a spoofing apparatus using the authentication result of another apparatus from using the processing function of the detachable device 100. Note that it is only the analysis processing function that is disabled here. For this reason, if the detachable device 100 has a storage processing function, the detachable device 100 can be used as an external memory that stores data transmitted from the image capturing apparatus 110.

As described above, in this embodiment, for the image capturing apparatus 110 that has failed in authentication, the detachable device 100 disables a selected function in one or more predetermined functions held by the self-device. This makes it possible to provide the predetermined function only to, for example, the image capturing apparatus 110 whose operation for the predetermined function is confirmed in advance.

Note that in the above-described embodiment, processing in a case in which image data based on an image captured by the image capturing apparatus 110 is input to the detachable device 100, and the detachable device 100 is caused to execute predetermined processing has been described. However, the present invention is not limited to this. For example, similar processing can be executed in a case in which audio data based on an audio recorded by the image capturing apparatus 110 is input to the detachable device 100, and the detachable device 100 is caused to execute predetermined processing. Note that the audio data can be, for example, audio data based on recording that is performed at the same time as image capturing, but may be audio data in a case in which only an audio is recorded without image capturing. That is, the above-described processing can be configured to be executed for at least one of image data and audio data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033752, filed Feb. 28, 2020 which is hereby incorporated by reference herein in its entirety.

What is claimed is:

1. A device mounted in an image capturing apparatus including a mounting part capable of detaching/attaching the device, comprising:
   a reconfigurable device that is capable of being set for executing at least one predetermined processing for at least one of image data captured by the image capturing apparatus and audio data recorded by the image capturing apparatus when the device is mounted in the image capturing apparatus including the mounting part;
   a processing circuit; and
   a memory that stores a computer-readable instruction for causing, when executed by the at least one processing circuit, the device to:
      execute authentication based on identification information of the image capturing apparatus;
      if the authentication succeeds, control the reconfigurable device such that processing selected by the image capturing apparatus from the at least one predetermined processing is executed for at least one of the image data and the audio data; and
      if the authentication fails, perform control to reset circuit information configured in the reconfigurable device, thereby disabling a function of executing the selected processing.

2. The device according to claim 1, wherein if the authentication fails, setting of a set value concerning the function of executing the selected processing in the reconfigurable device is inhibited, thereby disabling the function.

3. The device according to claim 1, wherein if the authentication fails, activation of the reconfigurable device is inhibited, thereby disabling the function.

4. The device according to claim 1, wherein the reconfigurable device is a field programmable gate array (FPGA).

5. The device according to claim 1, wherein the authentication is executed based on authentication information generated based on identification information of the device, the identification information of the image capturing apparatus, and the selected processing.

6. The device according to claim 5, wherein first authentication information generated based on the identification information of the device and the identification information of the image capturing apparatus are transmitted to the image capturing apparatus and the first authentication information is held, and if second authentication information received from the image capturing apparatus matches third authentication information generated based on the first authentication information and the selected processing, the authentication succeeds.

7. The device according to claim 6, wherein the computer-readable instruction further causes the device to perform communication with the image capturing apparatus in accordance with a predetermined standard, and
   wherein the third authentication information is compared with the second authentication information included in a command transmitted from the image capturing apparatus to the device to request processing in the predetermined standard.

8. The device according to claim 6, wherein the computer-readable instruction further causes the device to perform communication with the image capturing apparatus in accordance with a predetermined standard, and
   wherein the third authentication information is compared with the second authentication information included in at least one of the image data and the audio data transmitted from the image capturing apparatus to the device by the predetermined standard.

9. The device according to claim 6, wherein the computer-readable instruction further causes the device to request the second authentication information from the image capturing apparatus.

10. The device according to claim 9, wherein fourth authentication information that is different from the first authentication information is generated based on the identification information of the device and the identification information of the image capturing apparatus and the fourth authentication information is transmitted to the image capturing apparatus,
    the second authentication information is requested from the image capturing apparatus, and
    if the second authentication information matches fifth authentication information generated based on the fourth authentication information and the selected processing, the authentication succeeds.

11. The device according to claim 9, wherein if a condition to execute reauthentication is satisfied after the authentication succeeds, the second authentication information is requested again.

12. The device according to claim 11, wherein the condition is that a predetermined time has elapsed after the success of the authentication or that the number of times of execution of analysis processing exceeds a predetermined number of times after the success of the authentication.

13. The device according to claim 1, wherein the computer-readable instruction further causes the device to, if the authentication fails, notify the image capturing apparatus that the selected processing is invalid.

14. A control method executed by a device mounted in an image capturing apparatus including a mounting part capable of detaching/attaching the device, wherein the device includes a reconfigurable device that is capable of being set for executing at least one predetermined processing for at least one of image data captured by the image capturing apparatus and audio data recorded by the image capturing apparatus when the device is mounted in the image capturing apparatus, the control method comprising:
    executing authentication based on identification information of the image capturing apparatus;
    if the authentication succeeds, controlling the reconfigurable device such that processing selected by the image capturing apparatus from the at least one predetermined processing is executed for at least one of the image data and the audio data; and if the authentication fails, performing control to reset circuit information configured in the reconfigurable device, thereby disabling a function of executing the selected processing.

15. A non-transitory computer-readable storage medium that stores a program configured to cause a computer provided in a device mounted in an image capturing apparatus including a mounting part capable of detaching/attaching the device to execute a control method, wherein the device includes a reconfigurable device that is capable of being set for executing at least one predetermined processing for at least one of image data captured by the image capturing apparatus and audio data recorded by the image capturing apparatus when the device is mounted in the image capturing apparatus, the control method comprising:

executing authentication based on identification information of the image capturing apparatus;

if the authentication succeeds, controlling the reconfigurable device such that processing selected by the image capturing apparatus from the at least one predetermined processing is executed for at least one of the image data and the audio data; and if the authentication fails, performing control to reset circuit information configured in the reconfigurable device, thereby disabling a function of executing the selected processing.

16. The device according to claim 1, wherein all or more than half of the device can be inserted into the image capturing apparatus.

* * * * *